US012786664B2

(12) United States Patent
Agrawal et al.

(10) Patent No.: US 12,786,664 B2
(45) Date of Patent: Nov. 3, 2026

(54) GROUP DEVICE LOCATION COORDINATION

(71) Applicant: Motorola Mobility LLC, Chicago, IL (US)

(72) Inventors: Amit Kumar Agrawal, Bangalore (IN); Krishnan Raghavan, Bangalore (IN); Hariprasad Shanbhogue Alampady, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 227 days.

(21) Appl. No.: 18/646,295

(22) Filed: Apr. 25, 2024

(65) Prior Publication Data

US 2025/0338082 A1 Oct. 30, 2025

(51) Int. Cl.

| | |
|---|---|
| ***H04L 1/00*** | (2006.01) |
| ***H04W 4/024*** | (2018.01) |
| ***H04W 4/029*** | (2018.01) |
| *H04W 4/08* | (2009.01) |

(52) U.S. Cl.

CPC ........... *H04W 4/024* (2018.02); *H04W 4/029* (2018.02); *H04W 4/08* (2013.01)

(58) Field of Classification Search

CPC ....... H04W 4/024; H04W 4/029; H04W 4/08; H04L 51/26; H04L 51/24; H04L 67/18; H04M 1/72457; G06Q 10/1095; G06F 3/0481

See application file for complete search history.

(56) References Cited

U.S. PATENT DOCUMENTS

| | | | |
|---|---|---|---|
| 2008/0045234 A1 | 2/2008 | Reed | |
| 2020/0258051 A1* | 8/2020 | Ma | H04L 67/52 |
| 2021/0131813 A1 | 5/2021 | Chen et al. | |
| 2021/0158304 A1* | 5/2021 | Waldman | G06Q 10/109 |
| 2023/0049885 A1* | 2/2023 | Bakshi | H04L 51/222 |
| 2023/0267423 A1 | 8/2023 | Wagner | |
| 2025/0141824 A1 | 5/2025 | Liao | |
| 2025/0338085 A1 | 10/2025 | Agrawal et al. | |

OTHER PUBLICATIONS

Agrawal, Amit Kumar , et al., "Pursuant to MPEP § 2001.06(b) the applicant brings the following co-pending application to the Examiner's attention:", U.S. Appl. No. 18/646,317, filed Apr. 25, 2024, 86 pages.

Non-Final Office Action issued in U.S. Appl. No. 18/646,317, mailed May 14, 2026, 10 pages.

* cited by examiner

*Primary Examiner* — Phuoc H Doan

(74) *Attorney, Agent, or Firm* — FIG. 1 Patents

(57) ABSTRACT

In aspects of group device location coordination, a mobile device implements a group manager that establishes the mobile device as an organizer of a group of one or more additional devices. The group manager receives input to designate a geographical meeting location and an associated designated meeting time for the one or more additional devices. The group manager communicates a regroup indicator to the one or more additional devices that includes a displayable indication for the one or more additional devices to return to the geographical meeting location at the designated meeting time.

20 Claims, 18 Drawing Sheets

GROUP DEVICE LOCATION COORDINATION

BACKGROUND

Electronic devices, such as smartphones and other mobile devices, are often capable of electronic communication with other devices. Such electronic communication can include text messaging communications, emails, and so forth. In situations in which multiple individuals are gathered for tourism, conventions, live events, or other activities that involve traveling between different locations, text messaging between electronic devices can be utilized to support remote communication between the individuals. For example, device users can send text messages to other users to indicate their approximate current location within an area, make tentative plans to reconvene with other individuals at an approximate time and/or location, inform other individuals of events, and so forth. However, such communications rely on attentiveness of users to their devices and can be prone to error. In particular, users may inaccurately describe their location, communicate information that conflicts with information from other users, or forget to communicate with other users altogether, resulting in confusion and uncertainties as to user status. Miscommunications can also occur in situations in which users are not fluent in the same languages. Further, loss of connectivity of such devices can result in users becoming lost or inadvertently separated from other users. These technical shortcomings can lead to user frustration.

BRIEF DESCRIPTION OF THE DRAWINGS

Implementations of the techniques for group and subgroup device location coordination are described with reference to the following Figures. The same numbers may be used throughout to reference like features and components shown in the Figures.

DETAILED DESCRIPTION

Figure 1:
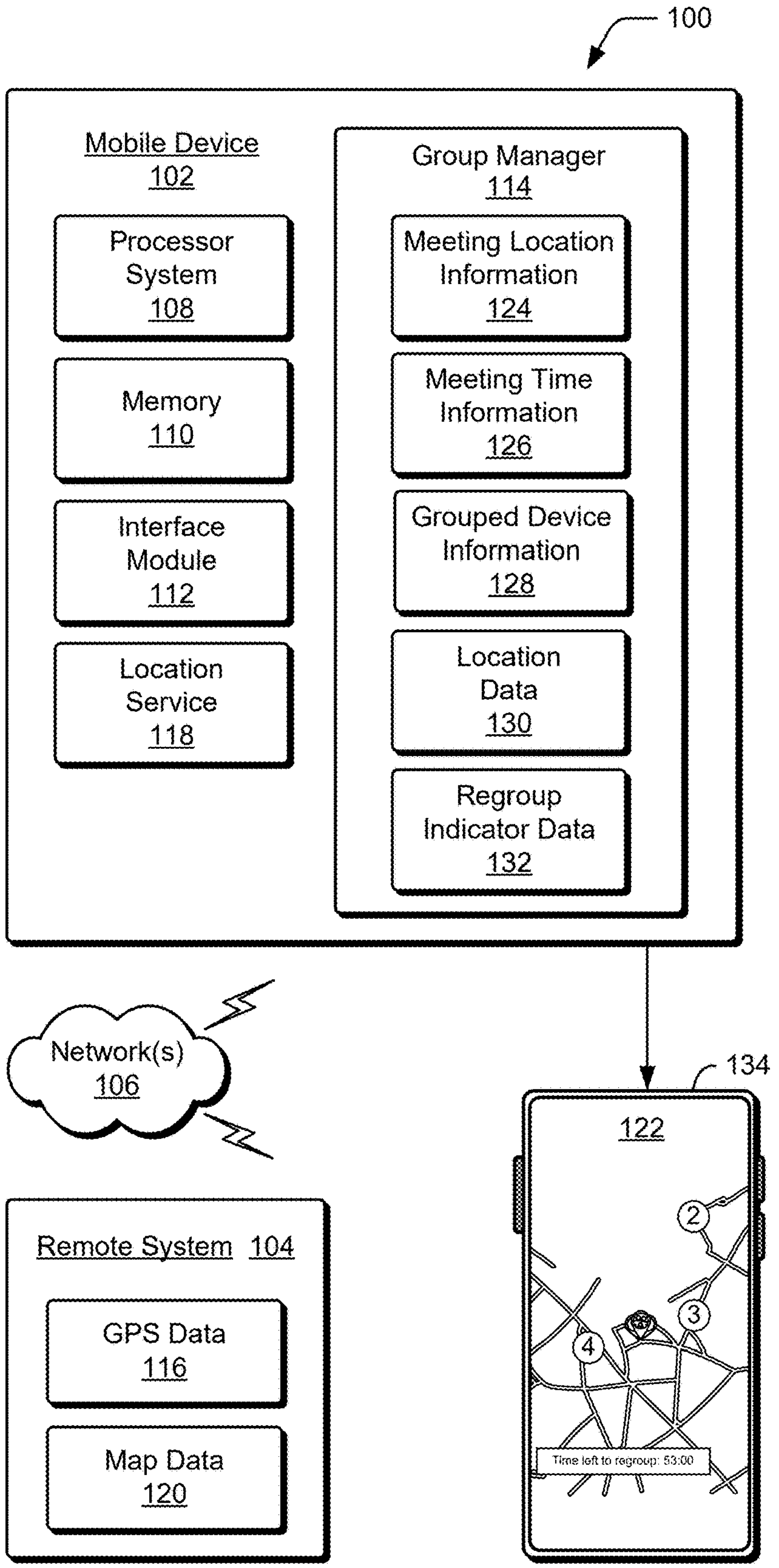
FIG. 1 illustrates an example system for group and subgroup device location coordination in accordance with one or more implementations as described herein.

Implementations of the techniques for group and subgroup device location coordination may be implemented as described herein. A mobile device, such as any type of a wireless device, media device, mobile phone, flip phone, client device, tablet, computing, communication, entertainment, gaming, media playback, and/or any other type of computing and/or electronic device, or a system of any combination of such devices, may be configured to perform techniques for group and subgroup device location coordination as described herein. In one or more implementations, a mobile device includes a group manager, which can be used to implement aspects of the techniques described herein.

Many activities in daily life involve coordination with other individuals. For example, family members often coordinate with each other to meet at locations such as a school, workplace, store, park, etc. Further, individuals often desire to coordinate with each other while engaging in activities such as tourism. Such coordination can include agreeing to one or more locations to visit together as a group. However, traveling exclusively as a group can cause some locations that may be of interest to particular individuals to be inaccessible due to time constraints and other factors. For instance, a group of individuals may travel together to a series of locations along a pre-determined route, but locations that are not along the pre-determined route may be too distant for the group to visit without deviating from a given schedule for the entire group. Thus, in some situations, it is desirable to allow one or more individuals to temporarily leave the group so that those individuals can visit other locations that are not along the pre-determined route for the group. However, such situations can increase complications associated with rejoining the individuals with the group.

As the use of portable electronic devices such as smartphones has expanded, remote communication between individuals has also expanded accordingly. Some conventional approaches to coordinating individuals include utilizing text messaging applications of smartphones. Such applications support remote communication of the individuals with each other over a network, such as a cellular network. However, such approaches are not without problems. For example, during conditions in which connectivity between a smartphone and the network is hindered (e.g., wireless signal quality between the network and the smartphone is low due to physical obstructions, network traffic, access point distance, etc.), the smartphone may be unable to send or receive text messages in a timely manner. In such situations, it may be difficult or impossible for the smartphone to communicate remotely with other devices, which may result in user frustration. Further, if such connectivity issues involve a smartphone of an individual that has been separated from a larger group of individuals, difficulties can occur that may prevent the individual from rejoining the group. For example, because the smartphone is unable to communicate remotely with the other devices, the individual may be unaware of a location of the group, changes to the travel route for the group, and so forth.

Further, even during conditions in which connectivity between the smartphone and the network is sufficient for communication via text messaging, such conventional approaches present additional issues for coordination of individuals. For example, such communications can often include inaccuracies resulting from mischaracterization of a described location or area, inconsistencies resulting from conflicting meeting times or other information described by messages from different individuals, miscommunications resulting from grammatical errors or misspellings, and so forth. Additionally, some individuals may be more responsive toward reviewing communications and responding to communications than others, which may result in undesired delays when such communications fail to solicit a response from some individuals of a group.

The concepts and technologies discussed herein track electronic mobile devices within a group and communicate a regroup indictor to the mobile devices to solve the problems associated with using conventional electronic communications such as text messages for coordinating individuals. In aspects of the described techniques, a group manager of a mobile device is employed to receive an input that designates a geographical meeting location for the mobile device and one or more additional devices. The mobile device communicates the geographical meeting location to the additional devices and tracks a location of each of the additional devices relative to the geographical meeting location. The mobile device further employs the group manager to communicate a regroup indicator to the additional devices, where the regroup indicator may include a displayable indication for an additional device (and user of the device) to return to the geographical meeting location. In this way, the mobile device coordinates the return of the additional devices to the geographical meeting location. This eliminates the need for the user of the mobile device to communicate manually via text message with the one or more additional devices to coordinate the return of the users of the additional devices to the geographical meeting location. Further, the regroup indicator provides the additional devices with the indication for the additional devices to return to the geographical meeting location even during conditions in which network connectivity between the additional devices and the mobile device may be relatively low or inoperable.

In at least one implementation, the mobile device designates a time for an additional device to return to the geographical meeting location, and the regroup indicator includes a displayable route guide indicating a route from the additional device to the geographical meeting location. The mobile device can coordinate the return of each of the additional devices to the designated meeting location. In some instances, additional geographical meeting locations and corresponding meeting times can be designated by the mobile device.

Additionally, the concepts and technologies discussed herein track electronic mobile devices within a subgroup and a regroup indictor can be communicated to the mobile devices to coordinate a regroup of the mobile devices to a secondary meeting location to solve the problems associated with using conventional electronic communications, such as text messages for coordinating individuals. In aspects of the described techniques, a group manager of a mobile device receives a designation of a geographical meeting location from a managing device.

The group manager establishes the designated mobile device as a coordinator of a subgroup of one or more of the multiple devices at a secondary meeting location. The mobile device also tracks a location of each of the multiple devices in the subgroup relative to the secondary meeting location via the group manager. The mobile device coordinates a regroup of the multiple devices in the subgroup at the secondary meeting location via the group manager prior to a designated time for all of the multiple devices to regroup at the geographical meeting location. In this way, prior to regrouping all of the multiple devices at the geographical meeting location, the mobile device coordinates regrouping of one or more of the multiple devices at the secondary meeting location. Thus, some of the multiple devices can regroup at the secondary meeting location prior to regrouping at the geographical meeting location, while other devices of the multiple devices regroup at the geographical meeting location without first regrouping at the secondary meeting location. This facilitates coordination and management of the devices within the subgroup separately, such that the devices within the subgroup are able to roam and regroup at the secondary meeting location without affecting the regrouping of all of the devices at the geographical meeting location.

In at least one implementation, the mobile device employs the group manager to set a scheduled secondary meeting time for the regroup of the one or more multiple devices in the subgroup at the secondary meeting location. Further, in at least one implementation, the mobile device determines a route between the secondary meeting location and the geographical meeting location and adjusts the scheduled secondary meeting time based on the route via the group manager. This functionality is not possible through conventional approaches.

While features and concepts of the described techniques for group and subgroup device location coordination is implemented in any number of different devices, systems, environments, and/or configurations, implementations of the techniques for group and subgroup device location coordination are described in the context of the following example devices, systems, and methods.

FIG. 1 illustrates an example system 100 for group and subgroup device location coordination, as described herein. The system 100 includes a mobile device 102, remote system 104, and a communication network 106. Examples of mobile device include at least one of any type of a wireless device, mobile device, mobile phone, flip phone, client device, companion device, tablet, computing device, communication device, entertainment device, gaming device, media playback device, and/or any other type of computing, consumer, and/or electronic device.

The mobile device 102 can be implemented with various components, such as a processor system 108 and memory 110, as well as any number and combination of different components as further described with reference to the example device shown in FIG. 19. In implementations, the mobile device 102 includes various radios for wireless communication with other devices. For example, the system and devices can include a Bluetooth (BT) and/or Bluetooth Low Energy (BLE) transceiver, as well as a near field communication (NFC) transceiver. In some cases, the system and devices include at least one of a WiFi radio, a cellular radio, a global positioning satellite radio, or any available type of device communication interface.

In some implementations, the devices, applications, modules, servers, and/or services described herein communicate via the communication network 106, such as for data communication with the mobile device 102. The communication network 106 includes a wired and/or a wireless network. The communication network 106 is implemented using any type of network topology and/or communication protocol, and is represented or otherwise implemented as a combination of two or more networks, to include IP-based networks, cellular networks, and/or the Internet. The communication network 106 includes mobile operator networks that are managed by a mobile network operator and/or other network operators, such as a communication service provider, mobile phone provider, and/or Internet service provider.

The mobile device 102 includes various functionality that enables the device to implement different aspects of group and subgroup device location coordination, as described herein. In one or more examples, an interface module 112 represents functionality (e.g., logic and/or hardware) enabling the mobile device 102 to interconnect and interface with other devices and/or networks, such as the communication network 106. For example, the interface module 112 enables wireless and/or wired connectivity of the mobile device 102.

The mobile device 102 can include and implement various device applications, such as any type of messaging application, email application, video communication application, cellular communication application, music/audio application, gaming application, media application, social platform applications, and/or any other of the many possible types of various device applications. Many of the device applications have an associated application user interface that is generated and displayed for user interaction and viewing, such as on a display screen of the mobile device 102. Generally, an application user interface, or any other type of video, image, graphic, and the like is digital image content that is displayable on the display screen of the mobile device 102.

In the example system 100 for group and subgroup device location coordination, the mobile device 102 implements a group manager 114 (e.g., as a device application). As shown in this example, the group manager 114 represents functionality (e.g., logic, software, and/or hardware) enabling aspects of the described techniques for group and subgroup device location coordination. The group manager 114 can be implemented as computer instructions stored on computer-readable storage media and can be executed by a processor system of the mobile device 102. Alternatively, or in addition, the group manager 114 can be implemented at least partially in hardware of the device.

In one or more implementations, the group manager 114 includes independent processing, memory, and/or logic components functioning as a computing and/or electronic device integrated with the mobile device 102. Alternatively, or in addition, the group manager 114 can be implemented in software, in hardware, or as a combination of software and hardware components. In this example, the group manager 114 is implemented as a software application or module, such as executable software instructions (e.g., computer-executable instructions) that are executable with a processor system of the mobile device 102 to implement the techniques and features described herein. As a software application or module, the group manager 114 can be stored on computer-readable storage memory (e.g., memory of a device), or in any other suitable memory device or electronic data storage implemented with the group manager. Alternatively or in addition, the group manager 114 can be implemented in firmware and/or at least partially in computer hardware. For example, at least part of the group manager 114 is executable by a computer processor, and/or at least part of the content manager is implemented in logic circuitry.

In the example system 100, the mobile device 102 utilizes global positioning system (GPS) data, such as GPS data 116, to determine a location of the mobile device 102 and a location of one or more external devices. The GPS data 116 is retrieved through communication with one or more GPS data sources, such as the remote system 104, via the communication network 106. Such GPS data sources can include, for example, one or more servers or databases located externally from the mobile device 102. The GPS data 116 includes data describing a geolocation of the mobile device 102 (e.g., physical coordinates of the mobile device 102) as well as a respective geolocation of each of the one or more external devices (e.g., devices managed by the mobile device 102 and/or devices managing the mobile device 102). The GPS data 116 is received in accordance with requests communicated by location service 118, at least in one implementation. In particular, the location service 118 communicates requests to retrieve GPS data 116 from the GPS data sources via the communication network 106 on behalf of the mobile device 102. The location service 118 is also employed by the mobile device 102 to receive and process the GPS data 116.

Additionally, the mobile device 102 utilizes map data 120 for displaying the locations of devices within a group and/or a subgroup. For example, the map data 120 includes data describing various landmarks within an area of the mobile device 102 and the one or more devices, such as roads, buildings, and rivers, among others. The map data 120 is used by the group manager 114 in combination with the GPS data 116 to indicate the location of the mobile device 102 and the one or more other devices within the area. In some instances, the map data 120 is acquired by the mobile device 102 from the remote system 104. However, in some instances, the map data 120 is stored locally on the mobile device 102 (e.g., within memory 110).

In this example system 100, the group manager 114 is employed by the mobile device 102 to perform operations related to group and subgroup device location coordination according to the techniques described herein. The mobile device 102 can receive input via a user interface 122, and the group manager 114 designates various meeting parameters based on the input. The group manager 114 is further configured to receive meeting parameters as input from other devices, such as devices external to the mobile device 102. The memory 110 maintains the meeting parameters, which may include various information related to coordination of the mobile device 102 and one or more other devices external to the mobile device 102, such as a designation of a geographical meeting location and regroup parameters for the mobile device 102 and other devices. For example, the meeting parameters may include, in at least one implementation, meeting location information 124, meeting time information 126, grouped device information 128, location data 130, and regroup indicator data 132.

The group manager 114 can initiate to display information relating to group and subgroup device location coordination via the user interface 122. The user interface 122 is displayable via a display device 134 of the mobile device 102. Information displayed via the user interface 122 can include, for example, icons corresponding to the one or more external devices and the mobile device 102 in various menus and/or other portions of the user interface 122. The displayable icons represent the respective tracked location of each of the one or more additional devices relative to the geographical meeting location, as described further below. In at least one implementation, the mobile device displays a different indicator representing a given device based on whether the device is included within a group of devices, a subgroup of devices, or both. For example, the mobile device 102 can employ the group manager 114 to display a first type of visual indicator (e.g., an icon with a first color or appearance) for each respective device of the multiple devices in a subgroup via the user interface 122. The mobile device 102 can also employ the group manager 114 to display a second type of visual indicator (e.g., an icon with a second color or appearance, different than the first color or appearance) for each respective device of the multiple devices that is not within the subgroup.

The mobile device 102 employs the group manager 114 to establish the mobile device 102 as a coordinator of a group and/or a subgroup of one or more of multiple devices. Data describing devices included within a group and/or a subgroup is stored as grouped device information 128. For example, during conditions in which the mobile device 102 employs group manager 114 to form a group including the mobile device 102 and one or more external devices, the grouped device information 128 includes data describing the group and the devices included within the group (e.g., names of the devices, identification numbers of the devices, etc.). During conditions in which the mobile device 102 employs the group manager 114 to form a subgroup, the grouped device information 128 includes data describing the subgroup and the devices included within the subgroup (e.g., device names, identification numbers, etc.).

Forming a subgroup via the group manager 114 includes determining one or more devices within a group (also referred to a as a primary group) that are also to be included within the subgroup. In particular, a given device, such as the mobile device 102 or a device external to the mobile device 102, can be included within a group as well as a subgroup. In one example scenario, a group includes the mobile device 102, a first external device, a second external device, and a third external device. The mobile device 102 forms a subgroup including the mobile device 102 and any of the first external device, second external device, or third external device. Data describing devices included by each of the group and the subgroup is included in the grouped device information 128.

Location data 130 is maintained in the memory 110 of the mobile device 102 and includes a tracked location of each of the one or more devices managed by the group manager 114 of the mobile device 102. For example, following the formation of a group that includes the mobile device 102 and one or more external devices via the group manager 114, the group manager 114 tracks a physical location of each of the devices within the group. Data describing the tracked locations is included in the location data 130. The data describing the tracked locations may be based on GPS data 116 in some instances. For example, each external device managed by the group manager 114 of the mobile device 102 may acquire respective GPS data and communicate the GPS data to the group manager 114 of the mobile device 102 for tracking of the devices. In some examples, the group manager 114 may track the locations of the external devices in a different manner, such as through ultra-wideband communications between the mobile device 102 and the external devices. The tracked locations of the devices are included (e.g., stored), in the location data 130.

In at least one implementation, the location data 130 includes data describing a current location of each device within the group as well as historical data describing one or more previous locations of the devices. For example, following formation of the group, the group manager 114 may be employed by the mobile device 102 to acquire data describing the location of each of the devices within the group at pre-determined intervals (e.g., every thirty seconds following formation of the group, every five minutes following formation of the group, etc.). The data describing the location of the devices at each pre-determined interval may be included in the location data 130. In at least one implementation, the group manager 114 references the historical location data to generate a path associated with each device, where the path indicates the travel of the device following the formation of the group.

In at least one implementation, the location data 130 describes the location of devices within the group relative to one or more geographical meeting locations described by the meeting location information 124. For example, the locations of the devices may be described by the location data 130 using a vector between a given device and a given geographical meeting location described by the meeting location information 124. In this example, the vector describes a distance and direction of the given device from the given geographical meeting location. During conditions in which the meeting location information 124 describes multiple geographical meeting locations, the location data 130 may include data describing the location of each device within the group relative to each of the geographical meeting locations. Examples of data included by the meeting location information 124 are described further below.

In at least one implementation, the location data 130 describes the location of each device within a subgroup relative to one or more secondary meeting locations. In the example described above in which devices are included within the group, the location data 130 additionally includes data describing the location of devices included within a subgroup of the group relative to one or more secondary meeting locations associated with the subgroup. For example, for a device included in each of the group and the subgroup, the location data 130 may include data describing the location of the device relative to each geographical meeting location associated with the group, as well as each secondary location associated with the subgroup.

The group manager 114 implements the meeting location information 124 for operations related to the group and subgroup device location coordination according to the techniques described herein. In at least one implementation, the meeting location information 124 includes data describing one or more geographical meeting locations. For example, the data describing the one or more geographical meeting locations may include GPS coordinates, addresses, names, and/or other data describing the physical location of each of the one or more geographical meeting locations. The data included by the meeting location information 124 may describe geographical meeting locations for the mobile device 102 and one or more devices external to the mobile device 102, as well as one or more secondary meeting locations for the mobile device 102 and/or the one or more external devices. During conditions in which the group manager 114 is employed to communicate the one or more geographical meeting locations and/or secondary meeting locations to one or more devices external to the mobile device 102, the group manager 114 may transmit the meeting location information 124 to the external devices.

In situations in which the meeting location information 124 includes data describing multiple geographical meeting locations, the meeting location information 124 may also include data describing a sequence associated with the multiple geographical meeting locations. In an example, the meeting location information 124 describes a first geographical meeting location for regrouping (e.g., rejoining, gathering, convening, etc.) of the mobile device 102 and other devices included within a group. In this example, the meeting location information 124 additionally describes an additional geographical meeting location for regrouping the mobile device 102 and the other devices included within the group. The meeting location information 124 further describes a sequence of the geographical meeting location and the additional geographical meeting location, such that the mobile device 102 and the other devices first regroup at the geographical meeting location and then regroup at the additional geographical meeting location, or vice versa.

In some situations, the group manager 114 may update the meeting location information 124. Such updates may include, for example, updating coordinates associated with one or more of the geographical meeting locations and/or secondary meeting locations. In at least one implementation, updating the meeting location information 124 may occur responsive to an update request received from one or more of the external devices. The update request, for example, may include coordinates, names, addresses, and/or other data used to update the meeting location information 124 via the group manager 114.

In at least one implementation, the data included by the meeting location information 124 describing one or more geographical meeting locations and/or secondary meeting locations refers to a physical location of the mobile device 102. For example, the group manager 114 may receive input (via the user interface 122 and/or electronic communications from one or more external devices) that sets a geographical meeting location and/or secondary meeting location to the current geographical location (e.g., physical location) of the mobile device 102. In this example, as the physical location of the mobile device 102 changes (e.g., due to travel of the mobile device 102 within an area or region), the meeting location information 124 is continuously updated by the group manager 114 to specify the coordinates or other data describing the physical location of the mobile device 102. The coordinates or other data describing the physical location of the mobile device 102 may be sourced from GPS data 116, at least in one implementation. Further, the group manager 114 may be employed to communicate the physical location of the mobile device 102 described by the meeting location information 124 to the one or more devices external to the mobile device 102.

In at least one implementation, the mobile device 102 employs the group manager 114 to set a virtual perimeter around one or more geographical meeting locations and/or secondary meeting locations. The virtual perimeter may be set based on input provided to the group manager 114 through the user interface 122, at least in some instances. In an example, during formation of a group via the group manager 114, the mobile device 102 receives input via the user interface 122 that describes a size and/or shape of a virtual perimeter associated with a geographical meeting location. While tracking the location of each of the one or more devices within the group, if a device travels to a location that is outside of an area defined by the virtual perimeter, the group manager 114 generates an alert (e.g., an audio indication and/or displayable visual indication) at the device traveling outside of the defined area and/or at the mobile device 102. Data describing the size, shape, and location of the virtual perimeter is included within the meeting location information 124 in some examples and is maintained in memory 110.

In at least one implementation, a size of the virtual perimeter is based on a route from a geographical meeting location to a secondary meeting location. In an example, the meeting location information 124 describes a geographical meeting location associated with a group, and a secondary meeting location associated with a subgroup of the group. A virtual perimeter associated with the secondary meeting location is defined via input applied through the user interface 122, and a size of the virtual perimeter is automatically determined by the group manager 114 based on a length of a route from the secondary meeting location to the geographical meeting location. During conditions in which the route is shorter, the size of the virtual perimeter may be larger, and during conditions in which the route is longer, the size of the virtual perimeter may be smaller. By automatically determining the size of the virtual perimeter, a likelihood of delays of regrouping devices at the geographical meeting location may be reduced by decreasing the distance at which devices can travel away from the secondary meeting location before receiving an alert that the virtual perimeter has been crossed.

In at least one implementation, a size and/or shape of a virtual perimeter associated with a geographical meeting location is based on a designated meeting time associated with the geographical meeting location. In an example, during formation of a group including the mobile device 102 and one or more other devices via the group manager 114, a geographical meeting location is input (e.g., selected) for regrouping of the mobile device 102 and the other devices. A meeting time is also designated (e.g., specified by input to the user interface 122), and based on a difference between the time at which the group is formed and the designated meeting time, the size of the virtual perimeter associated with the geographical meeting location is automatically set. In situations in which the difference between the times is shorter (e.g., regrouping of the devices is set to occur sooner), the virtual perimeter may be smaller, and during situations in which the difference between the times is larger, the virtual perimeter may be larger. By setting the size and/or shape of the virtual perimeter automatically in this way, a likelihood of delays to the regrouping of the devices may be reduced by decreasing the distance at which the devices may wander from the geographical meeting location via the virtual perimeter before receiving an alert that the virtual perimeter has been crossed.

In at least one implementation, during formation of a subgroup of a group (e.g., a primary group) via the group manager 114, the group manager 114 determines a threshold distance of a secondary meeting location associated with the subgroup from the geographical meeting location associated with the group. The threshold distance may be based on regroup parameters associated with the group in some instances. As an example, while setting a location of the secondary meeting location via the group manager 114 (e.g., by applying input through the user interface 122), the group manager 114 provides an indication of the threshold distance from the geographical meeting location and the secondary meeting location can be set to locations within the threshold distance. However, the group manager 114 may prevent the secondary meeting location from being set to locations outside of the threshold distance. If a distance between a location selected for the secondary meeting location and the geographical meeting location exceeds the threshold distance, the group manager 114 outputs an alert and prevents the secondary meeting location from being set until a location within the threshold distance is selected.

The group manager 114 implements the meeting time information 126 for operations related to the group and subgroup device location coordination according to the techniques described herein. In at least one implementation, the meeting time information 126 includes data describing a time or duration to regroup the mobile device 102 and one or more external devices within a group described by the grouped device information 128 at a geographical meeting location described by the meeting location information 124. For example, a designated meeting time associated with the geographical meeting location for the mobile device 102 and the one or more external devices is set via input to the user interface 122 of the mobile device 102, and the designated meeting time is included in the meeting time information 126 maintained in the memory 110. In at least one implementation, the meeting time information 126 includes a designated meeting time associated with a secondary meeting location for the mobile device 102 and one or more external devices. In at least one implementation, each geographical meeting location and secondary meeting location described by data included in the meeting location information 124 is associated with a corresponding meeting time described by data included in the meeting time information 126.

In some situations, the group manager 114 may update the meeting time information 126. Such updates may include, for example, updating one or more meeting times associated with one or more of the geographical meeting locations and/or secondary meeting locations. In at least one implementation, updating the meeting time information 126 may occur responsive to an update request received from one or more of the external devices. The update request, for example, may include one or more requested times to be used to update the meeting time information 126 via the group manager 114.

One or more meeting times described by data included in the meeting time information 126 may be formatted in accordance with the Coordinated Universal Time format, in at least one implementation. In some instances, one or more meeting times described by the data included in the meeting time information 126 may be formatted as durations. For example, a meeting time associated with a geographical meeting location may be set as a duration, where the duration refers to an amount of time to elapse from the setting of the duration to the designated meeting time. As one example, a user of the mobile device 102 may desire to set a meeting time at a geographical meeting location corresponding to 2:00 pm local time, and the time at which the user sets the meeting time via input to the mobile device 102 through user interface 122 may be 12:00 pm local time. In one instance, the user may directly set the meeting time to 2:00 pm. In another instance, the user may set a duration to elapse before the meeting, such as two hours so that the designated meeting time coincides with 2:00 pm local time.

In at least one implementation, a meeting time associated with a secondary meeting location for a subgroup of a group is set by the group manager 114 based on input applied to the user interface 122. The group manager 114 then receives an updated regroup parameter from another device, such as data describing an updated geographical meeting location and/or an updated meeting time for the group. In order to accommodate the updated geographical meeting location and/or updated meeting time for the group while maintaining coordination of a subgroup at the secondary meeting location prior to the regrouping of the group, in some instances the group manager 114 advances the meeting time associated with the secondary meeting location. For example, the updated geographical meeting location may be further from the devices than the original (e.g., non-updated) geographical meeting location, and/or the updated meeting time for the group may be earlier than the original meeting time for the group. By advancing the meeting time associated with the secondary meeting location, the group manager 114 maintains the amount of time (e.g., duration) between the meeting time for the group at the geographical meeting location and the meeting time for the subgroup at the secondary meeting location. The amount by which the meeting time for the subgroup at the secondary meeting location is advanced may be based on a difference between the original meeting time for the group and the updated meeting time for the group, and/or a distance between the original geographical meeting location for the group and the updated geographical meeting location.

To support group and subgroup device location coordination according to the techniques described herein, the group manager 114 implements regroup indicator data 132 to communicate a regroup indicator to one or more additional devices external to the mobile device 102 (e.g., external devices). The regroup indicator includes data from the regroup indicator data 132 describing regroup parameters and/or instructions executable by the one or more external devices. As one example, the regroup indicator includes instructions executable by the one or more external devices to display an indication for the additional devices to return to a designated geographical meeting location for the group. The display of the indication is based on an amount of time remaining until a designated meeting time associated with the geographical meeting location. For example, the display of the indication may occur responsive to an amount of time remaining until the designated meeting time transitions below a threshold amount. The threshold amount may be based on a distance or route between the device on which the indication is to be displayed and the designated geographical meeting location.

In at least one implementation, the regroup indicator includes a displayable route guide indicating a route from a tracked location of a device in a group, such as the mobile device 102 or a device external to the mobile device 102, back to the geographical meeting location. For example, the regroup indicator includes route data in at least one implementation that is used to output the displayable route guide. In some instances, the regroup indicator includes an indication of a time duration to travel the route from the tracked location of the device back to the geographical meeting location, as well as an amount of time remaining until the designated meeting time associated with the geographical meeting location. The time duration to travel the route is based at least in part on the designated meeting time. In another implementation, the regroup indicator can include a displayable route guide indicating a route from a tracked location of a device in a subgroup to a secondary meeting location associated with the subgroup. The regroup indicator further displays an indication for the device to return to the secondary meeting location based on an amount of time remaining until a meeting time associated with the secondary meeting location.

In at least one implementation, the mobile device communicates an alert setting to the one or more multiple devices in the subgroup via the group manager. For each respective device of the multiple devices in the subgroup, the alert setting causes the respective device to output an alert to return to the secondary meeting location based on a distance between a location of the respective device and the secondary meeting location. In some instances, the secondary meeting location is based on a current geographical location of the mobile device.

Communicating the regroup indicator from the mobile device 102 via the group manager 114 to the external devices in this manner supports coordination of a group and/or one or more subgroups including the mobile device 102 without relying on manual communications for regrouping of the devices. For example, the mobile device 102 may establish a group including one or more additional devices and set regroup parameters for the devices included within the group, such as a designated geographical meeting location and designated meeting time for the devices within the group. The mobile device 102 tracks the locations of the external devices and a regroup indicator communicated to the external devices from the mobile device 102 alerts the devices when a time to return to the geographical meeting location has been reached. In some instances, the regroup indicator further displays a route for each device to return to the geographical meeting location.

In some situations, the mobile device 102 establishes a subgroup of a group via the group manager 114, and the subgroup includes one or more devices that are also included in the group. In such situations, management and coordination of the group is performed by another device separate from the mobile device 102 that includes a group manager similar to, or the same as, the group manager 114. However, the mobile device 102 performs operations related to location coordination and management of devices within the subgroup. For example, the mobile device 102 sets regroup parameters for the subgroup, such as a secondary meeting location for the subgroup and a meeting time for the subgroup. The mobile device 102 further communicates a regroup indicator to devices within the subgroup based on the regroup parameters. The regroup indicator supports a displayable indication at each of the devices within the subgroup that alerts the users of the devices in the subgroup to return to the secondary meeting location. In some instances, the regroup indicator also supports a displayable route for each device to return to the secondary meeting location. In this way, the group manager 114 supports management of the subgroup such that users in the subgroup can roam and regroup at the secondary meeting location without altering parameters associated with the regrouping of the larger group at the geographical meeting location. Thus, users of devices within the subgroup have greater freedom to explore and visit locations other than the geographical meeting location and can do so without relying on manual communications to arrive at the secondary meeting location, and then the geographical meeting location, at the respective designated meeting times.

Figure 2:
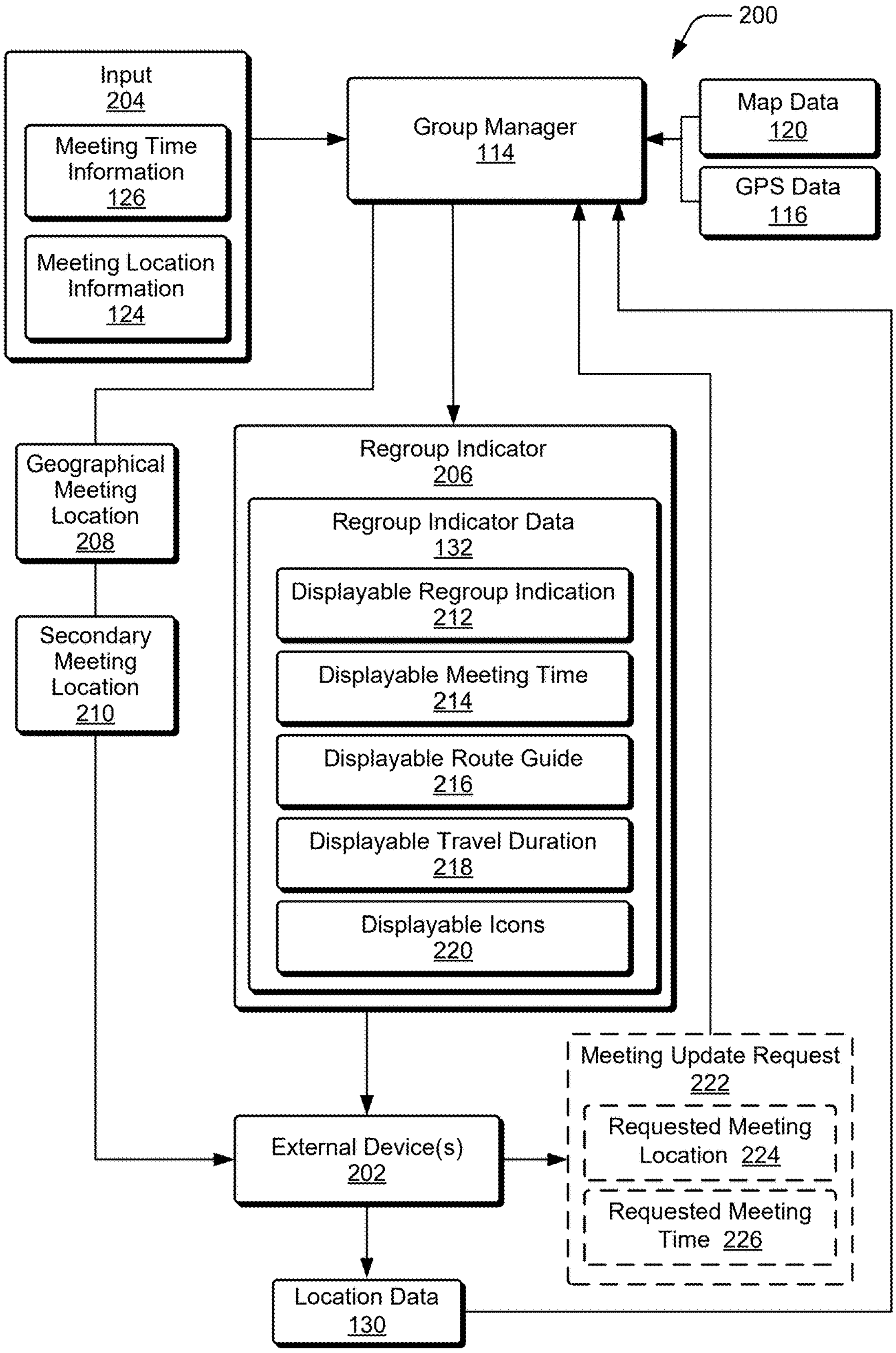
FIG. 2 further illustrates example operations of a group manager for group and subgroup device location coordination in accordance with one or more implementations as described herein.

FIG. 2 illustrates an example 200 of group and subgroup device location coordination, as described herein. In this example 200, the group manager 114 receives data from one or more external devices, such as external device 202, and communicates data to the one or more external devices. The group manager 114 is included or implemented in the mobile device 102 described above. The group manager 114 receives input 204 specifying the meeting time information and the meeting location information described above. In at least one implementation, the input 204 is received as input to the user interface 122 of the mobile device 102 (e.g., as touch inputs applied to the display device 134 in configurations in which the display device 134 is a touchscreen, through a user interface device such as a mouse, trackpad, or keyboard, etc.). The group manager 114 further receives map data 120 and the GPS data 116, such as from the remote system 104 described above.

The input 204 can indicate or specify various meeting parameters, and the meeting parameters are used to configure a regroup indicator 206 to be communicated to the one or more external devices 202 that are located geographically external to the mobile device 102. The meeting parameters can include, in at least one implementation, one or more geographical meeting locations, such as geographical meeting location 208, and/or one or more secondary meeting locations, such as secondary meeting location 210. In instances in which the group manager 114 is established as the organizer of a group of one or more of the external devices 202, the geographical meeting location 208 specifies the meeting location (e.g., regroup location) for the group of devices. In instances in which the group manager 114 is established as the organizer of a subgroup of a group of the devices, the secondary meeting location 210 indicates or specifies the meeting location for the subgroup. In at least one implementation, the mobile device 102 is established as the organizer of a group and the organizer of at least one subgroup of the group, where the subgroup includes at least one external device that is also included in the group. However, the mobile device 102 can also be established as the organizer of a subgroup without being established as the organizer of a group associated with the subgroup. For example, the group including the mobile device 102 can be managed by an external device including a group manager similar to, or the same as, the group manager 114, with the external device established as the organizer of the group while the mobile device 102 is established as the organizer of the subgroup.

The regroup indicator 206 can be communicated via the group manager 114 to the one or more external devices 202, which also communicate the location data 130 (e.g., the tracked location of each of the one or more external devices) back to the group manager 114. The group manager 114 configures the regroup indicator 206 based on the input 204. In this example, the regroup indicator 206 is shown including regroup indicator data 132, which includes a displayable regroup indication 212, a displayable meeting time 214, a displayable route guide 216, a displayable travel duration 218, and displayable icons 220. As described above, the regroup indicator 206 may include instructions that are executable by the one or more external devices, such as an external device 202, and the instructions may utilize the regroup indicator data 132 for displaying the displayable regroup indication 212, the displayable meeting time 214, and so forth at the one or more external devices. At least some of the data included by the regroup indicator data 132 may be sourced from the various data described above with reference to FIG. 1. For example, the displayable meeting time 214 may be based on the meeting time information 126, the displayable route guide 216 may be based on the location data 130, the displayable travel duration 218 may be based on each of the meeting time information 126 and the location data 130, and the displayable icons 220 may be based on the grouped device information 128.

In at least one implementation, one or more of the external devices, such as an external device 202, communicates a meeting update request 222 to the group manager 114. In some instances, the meeting update request 222 includes a requested meeting location 224 and/or a requested meeting time 226. The requested meeting location 224 may be a different meeting time than the time specified by the displayable meeting time 214, and/or the requested meeting location 224 may be a different meeting location than the geographical meeting location 208 (or different than the secondary meeting location 210 during conditions in which the group manager 114 manages a subgroup including the external device 202).

Responsive to receiving the meeting update request 222, the group manager 114 can update the meeting time information 126, the geographical meeting location 208, and/or the secondary meeting location 210 based on the content of the meeting update request 222. For example, a user of the mobile device 102 that includes or implements the group manager 114 can apply input via the user interface 122 to accept or decline the meeting update request 222. Accepting the meeting update request 222 causes the group manager 114 to update the meeting time information 126, geographical meeting location 208, and/or secondary meeting location 210, and declining the meeting update request 222 maintains the current meeting time information 126, geographical meeting location 208, and/or secondary meeting location 210. During conditions in which the meeting update request 222 is accepted, the group manager 114 also updates the regroup indicator 206 to include the updated displayable regroup indication 212, updated displayable meeting time 214, updated displayable route guide 216, and updated displayable travel duration 218. The group manager 114 communicates the updated regroup indicator 206 to the one or more external devices.

Figure 3:
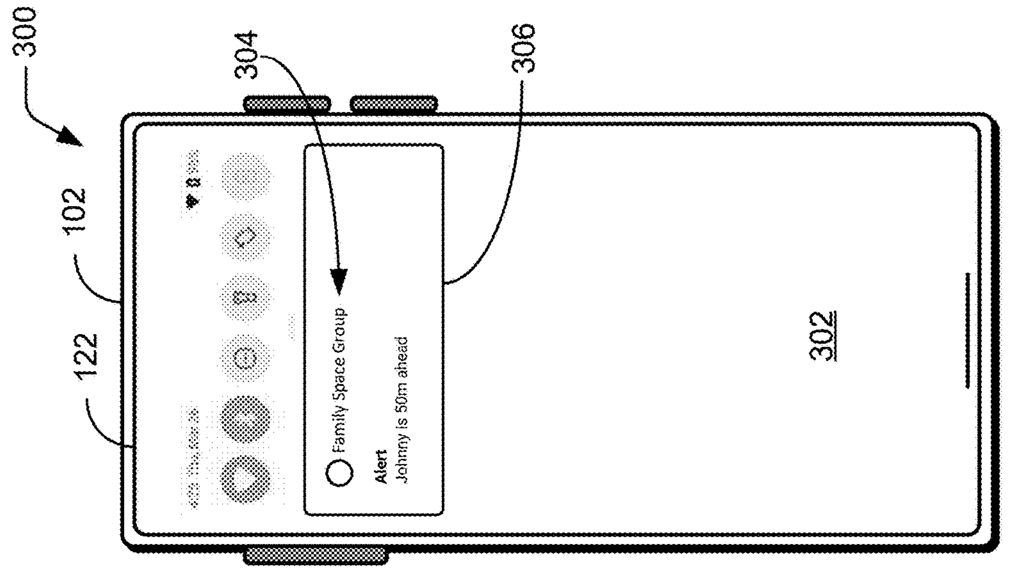
FIG. 3 illustrates an example user interface menu of a mobile device in accordance with one or more implementations as described herein.

FIG. 3 illustrates an example 300 of mobile device 102 implemented for group device location coordination using the group manager 114 according to the techniques described herein in one scenario. In this example 300, the mobile device 102 displays a user interface menu 302. The user interface menu 302 includes an indication of a managed group name 304 and a tracked location alert 306 identifying a distance to an external device managed by the mobile device 102. The external device is included within the group managed by the mobile device 102 (e.g., the group indicated by the managed group name 304).

Figure 4:
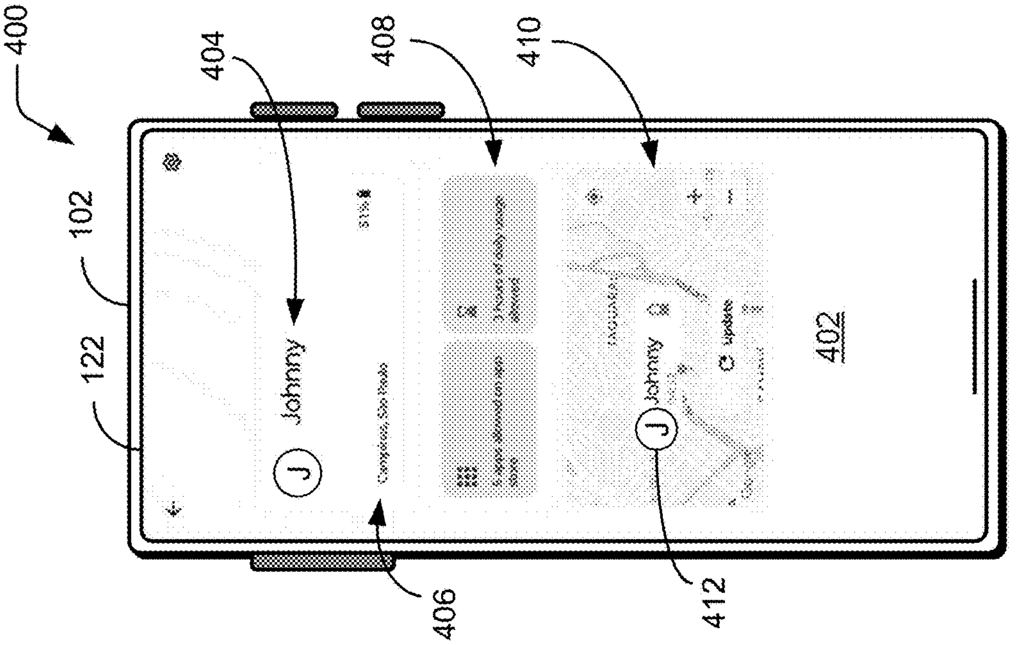
FIG. 4 illustrates another example user interface menu of a mobile device in accordance with one or more implementations as described herein.

FIG. 4 illustrates an example 400 of the mobile device 102 implemented for group device location coordination using the group manager 114 according to the techniques described herein in the scenario described with reference to FIG. 3. In this example 400, the mobile device 102 displays another user interface menu 402 that shows additional details describing the external device of FIG. 3 within the group managed by the mobile device 102 (e.g., the group for which the mobile device 102 is established as the organizer). The external device managed by the mobile device 102 is also referred to herein as a managed device. In the user interface menu 402, the managed device name 404 is shown, along with a location name 406 of the managed device. In this example, the mobile device 102 has set usage parameters 408 for the managed device. For example, the user of the mobile device 102 and the user of the managed device may have a parent/child relationship, and the user of the mobile device 102 sets the usage parameters 408 for the user of the managed device. The user interface menu 402 additionally displays a map 410 and managed device icon 412 indicating the tracked location of the managed device using the map 410. The map 410 may be based on the map data 120 as described above.

Figure 5:
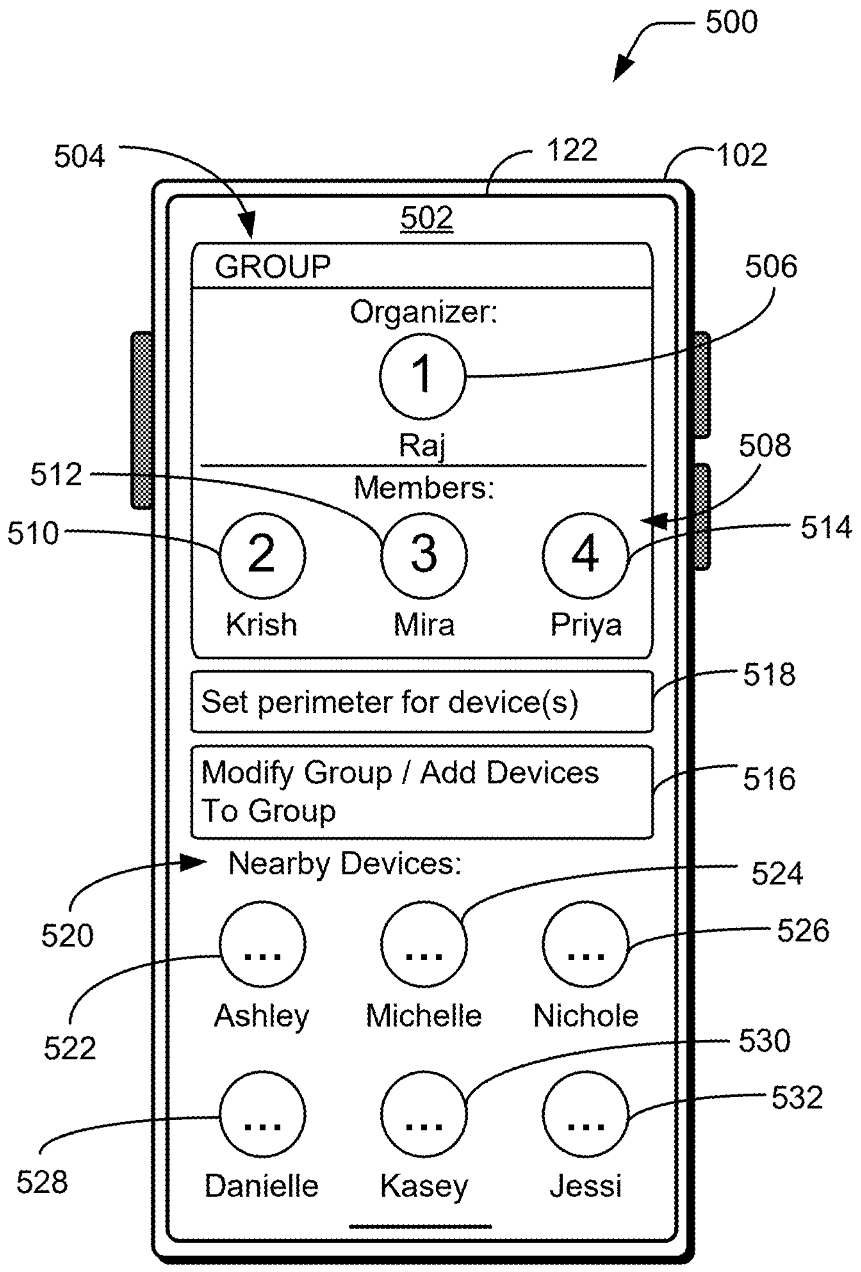
FIG. 5 illustrates a group device coordination user interface menu of a mobile device in accordance with one or more implementations as described herein.

FIG. 5 illustrates an example 500 of the mobile device 102 implemented for group device location coordination using the group manager 114 according to the techniques described herein in another scenario. In this example 500, the mobile device 102 is established as the organizer of a group via the group manager 114. The user interface 122 of the mobile device 102 displays a user interface menu 502 that facilitates the establishment of the mobile device 102 as the organizer and supports specifying various external devices to include within the group.

The user interface menu 502 shows a name 504 for the group. The name 504 can be modified by the user of the mobile device 102 via the user interface menu 502. The user interface menu 502 additionally shows managing device icon 506 representing the mobile device 102 within a hierarchy of the group (e.g., showing the mobile device 102 as the organizer of the group). The user interface menu 502 further shows external devices included within the group (e.g., members of the group, also referred to as managed devices and/or grouped devices), as indicated by grouped devices 508. The grouped devices 508 in this example include a first managed device represented by a first managed device icon 510, a second managed device represented by a second managed device icon 512, and a third managed device represented by a third managed device icon 514. External devices can be added to the group and/or removed from the group through interaction with a group modification button 516 of the user interface menu 502.

In at least one implementation, the mobile device 102 can also set one or more perimeters associated with the grouped devices 508. The perimeters, for example, specify a permitted area or region within which the grouped devices 508 can travel. During conditions in which a device travels outside of a perimeter specified by the mobile device 102, the group manager 114 outputs an alert at the mobile device 102 and/or at the device that has traveled outside of the perimeter, as described above. Setting the one or more perimeters can be performed through input to the user interface menu 502 using a set perimeter button 518.

In the example shown, the group manager 114 detects nearby devices (e.g., external devices within a proximity of the mobile device 102) and supports adding one or more of the nearby devices to the group via a nearby device menu 520 accessible via the user interface menu 502. In at least one implementation, the nearby devices are detectable by the group manager 114 via wired or wireless electronic communications, e.g., using a BT transceiver, BLE transceiver, and/or NFC transceiver of the mobile device 102 as described above. In at least one implementation, the mobile device 102 communicates with external devices via the BT transceiver, an ultra-wideband (UWB) transceiver, a cellular network transceiver, and/or a combination transceiver capable of transmitting and receiving electronic signals via a variety of protocols (e.g., BT, UWB, NFC, etc.). A selection of which communication protocol is utilized may be based on a distance between the mobile device 102 and an external device in communication with the mobile device 102 (e.g., UWB may be utilized at shorter distances, while cellular communications may be utilized at larger distances).

In this example, the group manager 114 detects multiple nearby devices (e.g., six nearby devices) represented by respective first through sixth nearby device icons 522-532. In other examples, the number and/or identification of the nearby devices may be different. During conditions in which the group manager 114 is employed to add devices to the group, the devices that can be added may include the nearby devices. This facilitates ease of forming a desired group of devices (e.g., during situations in which the mobile device 102 is the organizer for the group and the devices to be included in the group belong to tourists in a guided tour). In some examples, external devices can be added to the group based on a contacts list or profile list stored in the memory 110 of the mobile device 102. In some examples, an external device can utilize an application or other tool to specify whether the device is discoverable (e.g., detectable) by the mobile device 102.

Figure 6:
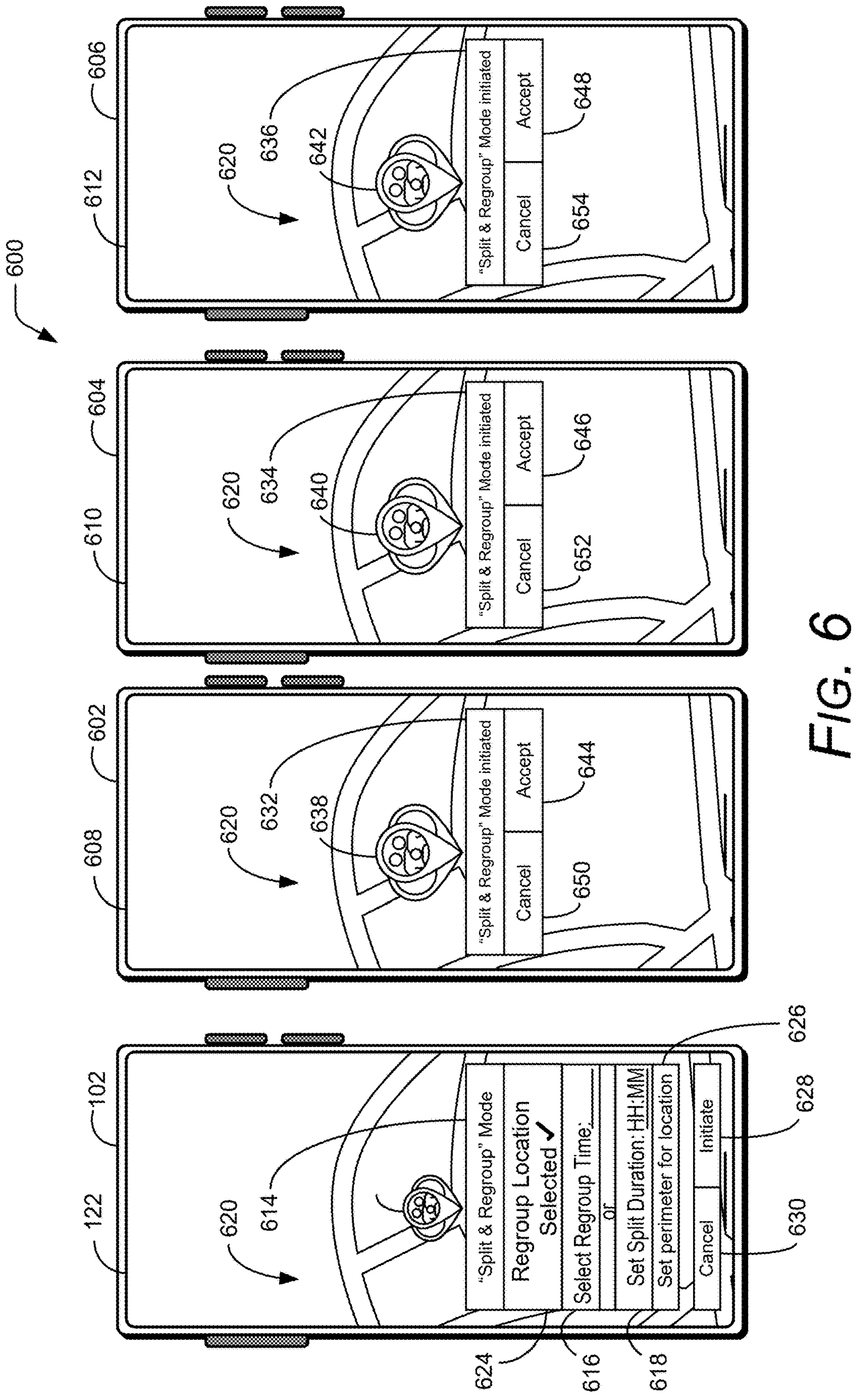
FIGS. 6-8 illustrate group device location coordination operations performed on various mobile devices in accordance with one or more implementations as described herein.

FIG. 6 illustrates an example 600 of the mobile device 102 implemented for group device location coordination using the group manager 114 according to the techniques described herein. In this example 600, the mobile device 102 is shown along with a first external device 602, a second external device 604, and a third external device 606. Each of the first external device 602, the second external device 604, and the third external device 606 is included within the group managed by the mobile device 102. The first external device 602 is represented by a first managed device icon 510 in FIG. 5, the second external device 604 is represented by a second managed device icon 512 in FIG. 5, and the third external device 606 is represented by a third managed device icon 514 in FIG. 5. Each external device includes a respective user interface, similar to the user interface 122. In particular, the first external device 602 displays a user interface 608, the second external device 604 displays a user interface 610, and the third external device 606 displays a user interface 612. Further, each external device may include a group manager similar to, or the same as, the group manager 114 included in or implemented by the mobile device 102, as well as other components included in mobile device 102 (e.g., the memory 110, the processor system 108, etc.). In the example 600, each of the external devices is a mobile device, e.g., a smartphone.

In this example 600, the mobile device 102 implements and employs the group manager 114 to specify parameters for the group, such as a geographical meeting location for the users of the group of respective devices and a meeting time for the group. In some instances, the mobile device 102 further employs the group manager 114 to specify a perimeter associated with the geographical meeting location. The parameters for the group are specified via input applied through the user interface 122. In particular, the user interface 122 is shown including a split and regroup mode menu 614, and input applied through the split and regroup mode menu 614 specifies the various group parameters.

In this example, specifying the meeting time includes inputting the meeting time as a Coordinated Universal Time via a regroup time selection menu 616 of the split and regroup mode menu 614, or inputting a duration until the desired meeting time via the regroup duration selection menu 618. In some instances, the meeting time is displayable as a local time for an area in which the mobile device 102 is located. The specified meeting time is included (e.g., stored) in the meeting time information 126.

The group manager 114 can also receive map data 120 and initiate a display of a map 620 based on the map data 120 using the user interface 122. The group manager 114 further receives the GPS data 116 and the location data 130 is used to display the location of the mobile device 102 on the map 620 using the GPS data 116. The tracked location of each external device may be shown on the map 620 based on the location data 130. In at least one implementation, a sequence of meeting times and corresponding geographical meeting locations may be set via the split and regroup mode menu 614. Each geographical meeting location may be represented by a different icon in the map 620.

The group manager 114 supports specifying a geographical meeting location for the group of devices via the split and regroup mode menu 614. In the example 600, the geographical meeting location has been specified based on an input applied to the split and regroup mode menu 614 and is represented by a selected location icon 622 in the map 620. The split and regroup mode menu 614 indicates that the geographical meeting location has been specified via location selection status indicator 624. In some instances, the geographical meeting location is specified by applying an input to the map 620 (e.g., by selecting a location in the map 620 representing the location of the geographical meeting location). In some instances, the geographical meeting location is specified by a user input of a name and/or address of the geographical meeting location, and the selected location icon 622 is displayed as the representation of the address in the map 620. In some instances, the geographical meeting location can be set to correspond to the location of the mobile device 102 or one of the external devices, and may update according to a location change, travel, and/or movement of the mobile device 102 or the external device.

A perimeter associated with the selected geographical meeting location may be specified via a set perimeter button 626. In some instances, the perimeter may be specified according to a selected distance from the geographical meeting location (e.g., a radius of one kilometer around the geographical meeting location). The perimeter may have a circular shape, an elliptical shape, a rectangular shape, or any other shape. In some instances, the perimeter may be specified based on an input applied to the map 620 (e.g., such that the input applied to the map 620 draws the perimeter on the map 620).

The split and regroup mode menu 614 further includes an initiate button 628 and a cancel button 630. Following input of the meeting time and the geographical meeting location, an input applied to the initiate button 628 causes the group manager 114 to communicate the regroup indicator 206 to each of the external devices. However, applying an input to the cancel button 630 removes the specified meeting time and geographical meeting location and exits the split and regroup mode menu 614.

Following communication of the regroup indicator 206 to the external devices, each external device may display a respective notification for acceptance or rejection of the specified meeting parameters. In the example 600, the first external device 602 is shown displaying a notification 632, the second external device 604 is shown displaying a notification 634, and the third external device 606 is shown displaying a notification 636, with each notification displayed responsive to receiving the regroup indicator 206 from the group manager 114 of the mobile device 102. Further, each external device displays a respective icon indicating the geographical meeting location in the map 620. For example, the first external device 602 is shown displaying an icon 638 via user interface 608, the second external device 604 is shown displaying an icon 640 via the user interface 610, and a third external device 606 is shown displaying a selected location icon 642 via the user interface 612, where each of icon 638, icon 640, and icon 642 represent the geographical meeting location in the map 620. The respective users of the first external device 602, the second external device 604, and the third external device 606 can accept the meeting parameters via an accept button 644, an accept button 646, and an accept button 648, respectively, or reject the meeting parameters via a cancel button 650, a cancel button 652, and a cancel button 654, respectively.

Figure 7:
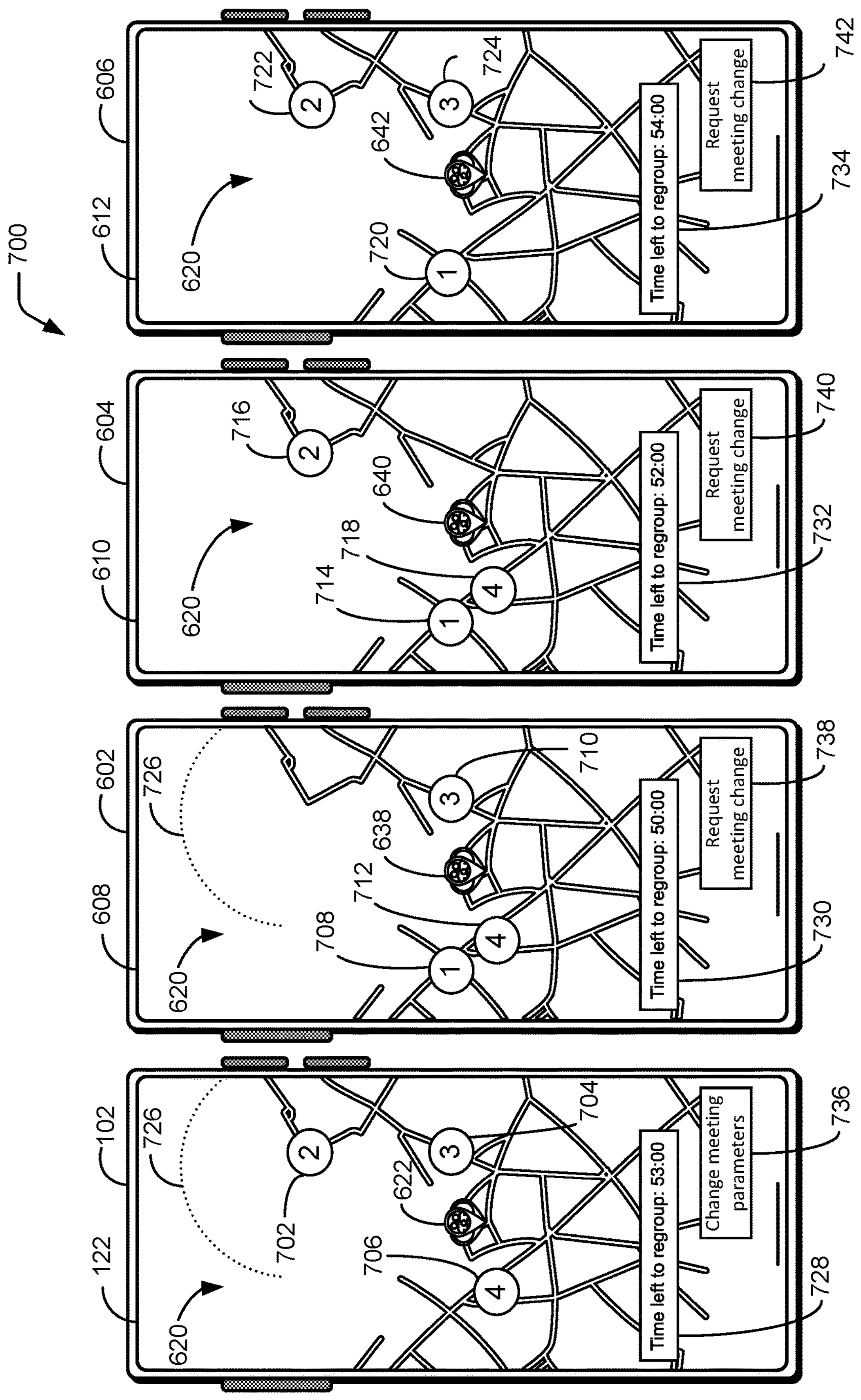

FIG. 7 illustrates an example 700 of mobile device 102 implemented for group device location coordination using the group manager 114 according to the techniques described herein. In this example 700, the meeting parameters described above with reference to FIG. 6 have been accepted by each of the respective users of the external devices, and the location of each external device is tracked by the group manager 114 of the mobile device 102. Further, the location of each external device, and the location of the mobile device 102, is indicated in the map displayed by each external device.

In at least one implementation, the group manager 114 of the mobile device 102 tracks the location of each external device and communicates the tracked location of all of the external devices to each external device. As one example, the group manager 114 of the mobile device 102 tracks the location of each of the first external device 602, the second external device 604, and the third external device 606, and communicates the location of the mobile device 102, as well as the location of the second external device 604, and the third external device 606 to the first external device 602. Similarly, the group manager 114 communicates the location of the mobile device 102, the first external device 602, and the third external device 606 to the second external device 604; and communicates the location of the mobile device 102, the first external device 602, and the second external device 604 to the third external device 606. Additionally and/or alternatively, the group manager 114 tracks the location of each of the external devices, and each external device communicates its location to each of the other external devices and to the mobile device 102.

In this example 700, each device displays icons in the map 620 that represent the locations of the other devices. For example, the mobile device 102 displays a first managed device icon 702 representing the location of the first external device 602, a second managed device icon 704 representing the location of the second external device 604, and a third managed device icon 706 representing the location of the third external device 606. The first external device 602 displays a managing device icon 708 representing the location of the mobile device 102, a second managed device icon 710 representing the location of the second external device 604, and a third managed device icon 712 representing the location of the third external device 606. The second external device 604 displays a managing device icon 714 representing the location of the mobile device 102, a first managed device icon 716 representing the location of the first external device 602, and a third managed device icon 718 representing the location of the third external device 606. Similarly, the third external device 606 displays a managing device icon 720 representing the location of the mobile device 102, a first managed device icon 722 representing the location of the first external device 602, and a second managed device icon 724 representing the location of the second external device 604. As each device travels within the area represented by the map 620, the position of the icons representing the devices in the map 620 updates accordingly to accurately indicate the current position (e.g., tracked position) of the devices.

In at least one implementation, the icons displayed by the mobile device 102 and the external devices may have different appearances. For example, although the managing device icon 708 displayed by the first external device 602, the managing device icon 714 displayed by the second external device 604, and the 720 displayed by the third external device 606 each represent the location of the mobile device 102, the appearance of the managing device icon 708 may be different than the appearance of the managing device icon 714 and/or the managing device icon 720. Similarly, the appearance of the managing device icon 714 may be different than the appearance of the managing device icon 720. For example, users of the devices may customize the appearances of the icons according to user preferences without altering which devices are represented by the icons. In at least one implementation, however, the appearance of the icons representing a given device is the same at each device.

Likewise, each device displays a respective icon indicating the geographical meeting location, and the icons may have different appearances for each device. For example, the mobile device 102 displays an icon 622, the first external device 602 displays an icon 638, the second external device 604 displays an icon 640, and the third external device 606 displays an icon 642, each representing the geographical meeting location. However, one or more of the icon 622, icon 638, icon 640, and icon 642 may have a different appearance relative to each other. In at least one implementation, the icons representing the geographical meeting location have a same appearance at each device.

In the example 700, the user interface 122 of the mobile device 102 and the user interface 608 of the first external device 602 each display a virtual perimeter 726. The virtual perimeter 726 is specified by the group manager 114 of the mobile device 102 based on input applied at the user interface menu 502 shown by FIG. 5 (e.g., using the set perimeter button 518 as described above). In the example shown, the virtual perimeter 726 is applied for the first external device 602, yet is not applied for the other external devices. The external device 602 outputs an alert during conditions in which the first external device 602 travels near and/or across the location indicated by the virtual perimeter 726, whereas the second external device 604 and the third external device 606 can travel across the location indicated by the virtual perimeter 726 without outputting the alert. As described above, in at least one implementation, a size and/or shape of the virtual perimeter 726 may be based on the meeting time for the devices at the specified geographical meeting location indicated by icon 622, icon 638, etc. For example, as a difference between a current time and the meeting time decreases, a distance of the virtual perimeter 726 from the geographical meeting location on the map 620 may decrease.

Each device in the group displays a respective meeting time indicator. A time displayed by the meeting time indicator is based on the current location of the device and/or a route from the device to the geographical meeting location, as well as the designated meeting time associated with the geographical meeting location. The meeting time indicators display a time remaining until the devices are to begin returning to the geographical meeting location. For example, the mobile device 102 displays a meeting time indicator 728 which includes a time remaining (e.g., fifty-three minutes) until the mobile device 102 is alerted via the regroup indicator 206 to return to the geographical meeting location. The first external device 602 displays a meeting time indicator 730 including a time remaining (e.g., fifty minutes) until the first external device 602 is alerted via the regroup indicator 206 to return to the geographical meeting location. The second external device 604 displays a meeting time indicator 732 including a time remaining until the second external device 604 is alerted via the regroup indicator 206 to return to the geographical meeting location. The third external device 606 displays a meeting time indicator 734 including a time remaining until the third external device 606 is alerted via the regroup indicator 206 to return to the geographical meeting location. Thus, the remaining time displayed by each meeting time indicator may be different for each device, based on the locations of the devices relative to the geographical meeting location. As a device travels farther from the geographical meeting location, the time remaining indicated by the corresponding meeting time indicator may decrease, and as the device travels closer to the geographical meeting location, the time remaining indicated by the corresponding meeting time indicator may increase.

In the example 700, each device further includes a respective user interface element that can be selected to request changes to the meeting parameters from the group manager 114 of the mobile device 102. For example, the user interface 122 of the mobile device 102 displays a meeting update button 736 which can be selected to update the meeting parameters for the group set by the group manager 114 of the mobile device 102. The user interface 608 of the first external device 602 displays a meeting change request button 738, the user interface 610 of the second external device 604 displays a meeting change request button 740, and the user interface 612 of the third external device 606 displays a meeting change request button 742, each of which can be selected to request changes to the meeting parameters for the group.

Changes to the meeting parameters that may be requested by the external devices or selected by the mobile device 102 may include, for example, changes to the meeting time for the group, changes to the geographical meeting location for the group, changes to which devices are included in the group, and/or changes to perimeters set for one or more devices of the group and/or perimeters associated with the geographical meeting location. Changes to the meeting time may include, for example, extensions or reductions to the meeting time (e.g., retarding or advancing the meeting time). Changes to the geographical meeting location may include, for example, changing the geographical meeting location to a different location, and/or adding or removing one or more meeting locations from a sequence of meeting locations set by the group manager 114 of the mobile device 102. Changes to which devices are included in the group may include, for example, adding one or more devices to the group and/or removing one or more devices from the group. Changes to the perimeters may include, for example, expanding or reducing one or more perimeters, and/or altering a shape of one or more perimeters.

In at least one implementation, requests for changes to the group parameters communicated from one or more of the external devices are received by the mobile device 102, and the changes are accepted or rejected responsive to input applied to the mobile device 102 through user interface 122. In at least one implementation, requests for changes to the group parameters are communicated to one or more external devices included in the group, and the respective users of the one or more devices may vote via input applied to the respective user interface of each device as to whether the changes should be accepted or rejected. If a majority of the one or more devices indicate that the changes should be accepted via the input, the group manager 114 of the mobile device 102 applies the changes to the group parameters.

Figure 8:
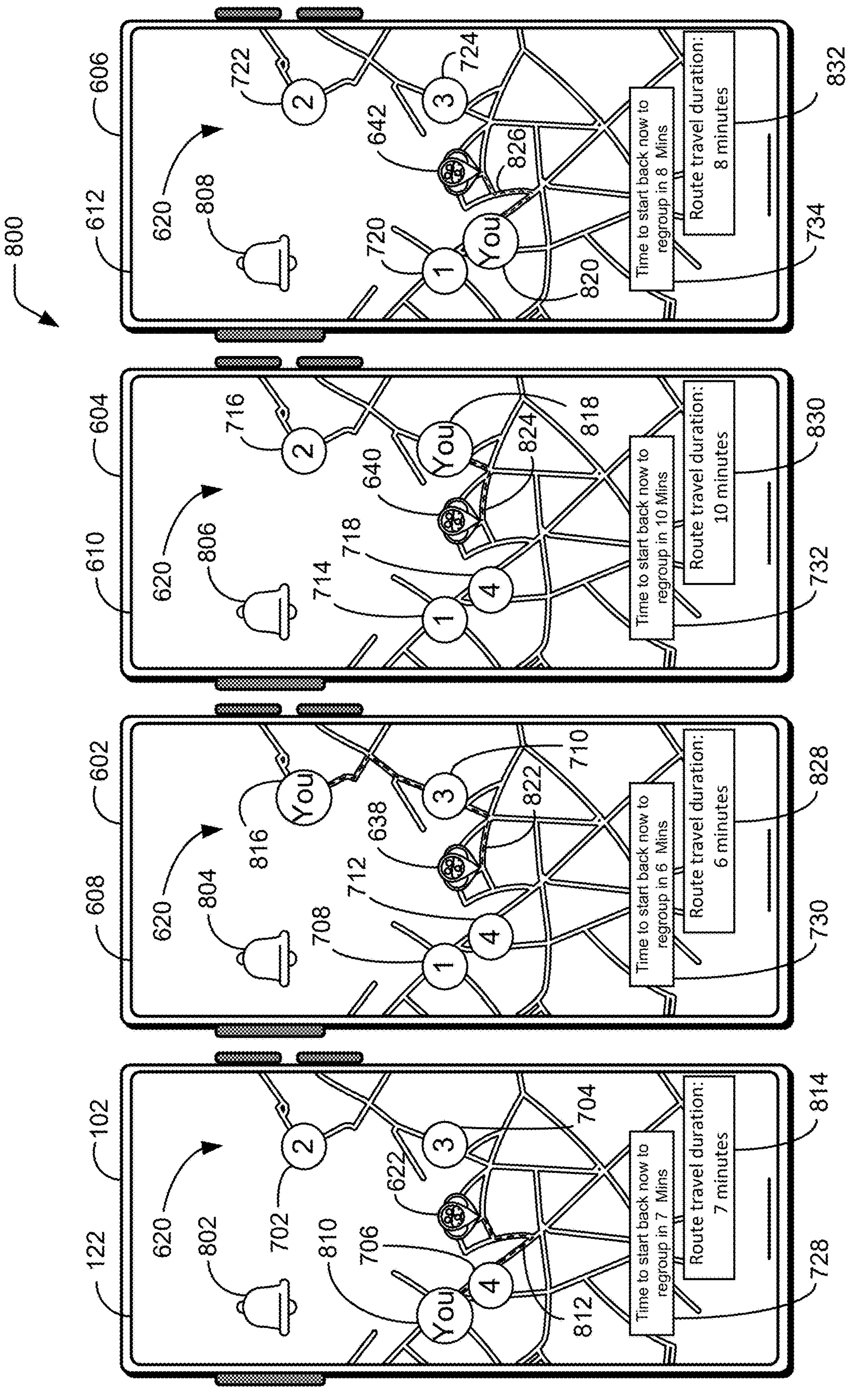

FIG. 8 illustrates an example 800 of the mobile device 102 implemented for group device location coordination using the group manager 114 according to the techniques described herein. In this example 800, sufficient time has elapsed following the example 700 described above with reference to FIG. 7 to cause the regroup indicator 206 to output alerts to the devices included within the group to return to the geographical meeting location. In particular, the regroup indicator 206 causes the mobile device 102 to output a regroup alert 802. The regroup indicator 206 additionally causes the first external device 602 to output and/or display a regroup alert 804, causes the second external device 604 to output and/or display a regroup alert 806, and causes the third external device 606 to output and/or display a regroup alert 808. The alerts may also be referred to herein as indications. The group manager 114 of the mobile device 102 displays the current location of the mobile device 102 via the user interface 122 (e.g., the physical location of the mobile device 102 within the area represented by map 620). The location of the mobile device 102 is indicated by a current position icon 810. The group manager 114 additionally generates and displays a route between the current location of the mobile device 102 and the geographical meeting location via a route guide 812. A duration to travel the route indicated by the route guide 812 is displayed via a travel duration indicator 814.

Each external device also displays corresponding indicators similar to those described above. For example, the first external device 602 displays a current position icon 816 indicating a location of the first external device 602, the second external device 604 displays a current position icon 818 indicating a location of the second external device 604, and the third external device 606 displays a current position icon 820 indicating a location of the third external device 606. Further, the first external device 602 displays a route between the first external device 602 and the geographical meeting location via a route guide 822, the second external device 604 displays a route between the second external device 604 and the geographical meeting location via a route guide 824, and the third external device 606 displays a route between the third external device 606 and the geographical meeting location via a route guide 826. A duration to travel the route indicated by the route guide 822 is displayed via a travel duration indicator 828, a duration to travel the route indicated by the route guide 824 is displayed via a travel duration indicator 830, and a duration to travel the route indicated by the route guide 826 is displayed via a travel duration indicator 832.

In at least one implementation, one or more of the devices additionally display directions to travel the routes indicated by the respective route guides. Such directions may include, for example, textual directions such as instructions to turn at particular roads, landmarks, etc. As a device travels toward the geographical meeting location along the respective route associated with the device, the travel duration indicator of the device updates to display an updated duration to travel the route (e.g., as the distance between the device and the geographical meeting location decreases, the indicated duration to travel the route decreases). In at least one implementation, the icons representing the external devices and the mobile device 102 update as the devices return toward the geographical meeting location (e.g., the position of the icons in the map 620 update to indicate the travel of the devices toward the geographic meeting location).

Figure 9:
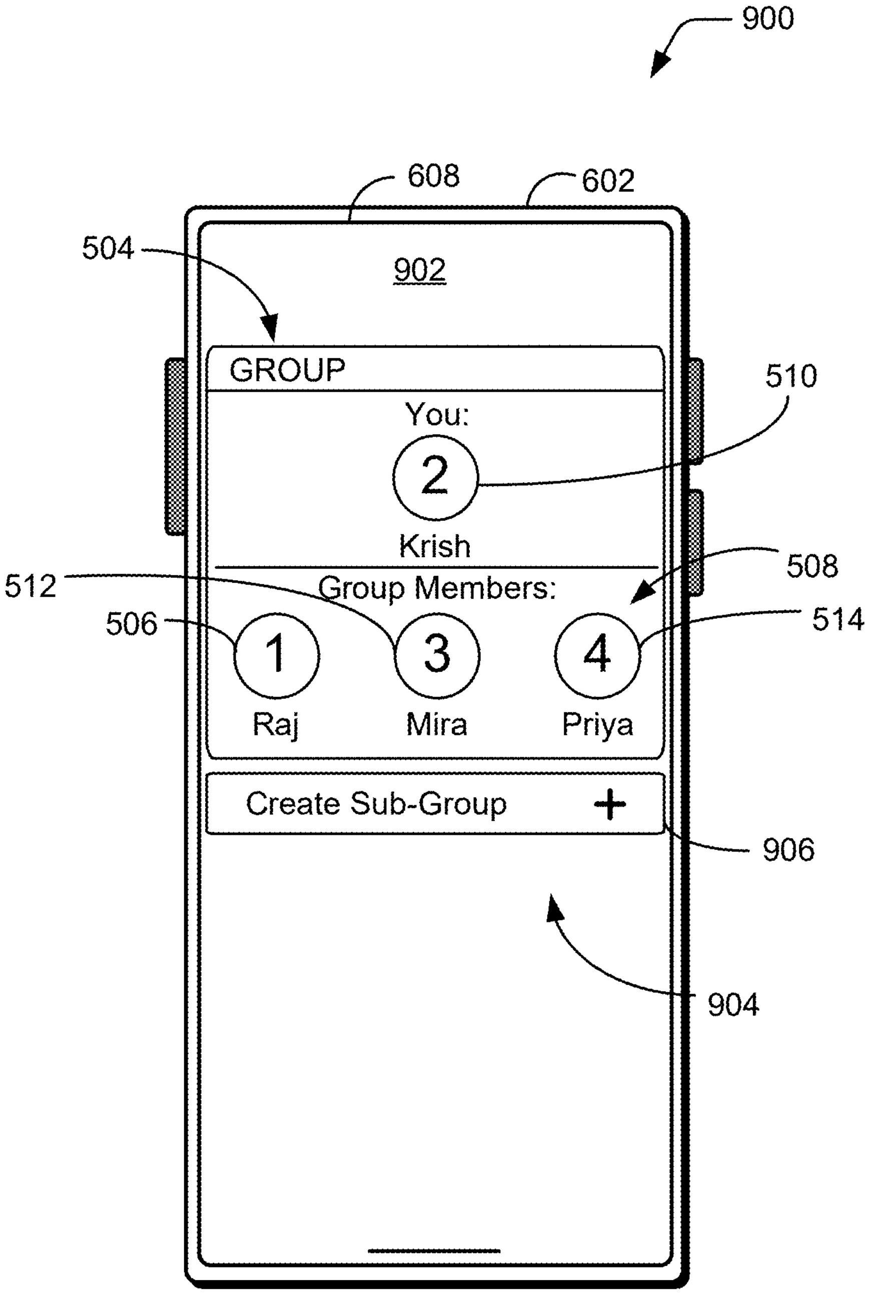
FIGS. 9-10 illustrate a subgroup device coordination user interface menu in accordance with one or more implementations as described herein.

FIG. 9 illustrates an example 900 of implementation of subgroup device location coordination according to the techniques described herein. In this example 900, the user interface 608 of the first external device 602 displays a user interface menu 902 that supports the establishment of the first external device 602 as the organizer of a subgroup and supports specifying various other devices to include within the subgroup, such as the mobile device 102, the second external device 604, the third external device 606, and/or additional external devices in the subgroup.

The user interface menu 902 shows various parameters related to the group, including in the examples described with reference to FIGS. 7 and 8, the mobile device 102, the first external device 602, the second external device 604, and the third external device 606. For example, a user interface menu 902 shows a name 504 of the group, a first managed device icon 510, and the grouped devices 508. The user interface menu 902 further includes a subgroup management menu 904 and a subgroup generation button 906 of the subgroup management menu 904. An input may be applied to the subgroup generation button 906 to generate a subgroup including one or more devices, as described further below.

Figure 10:
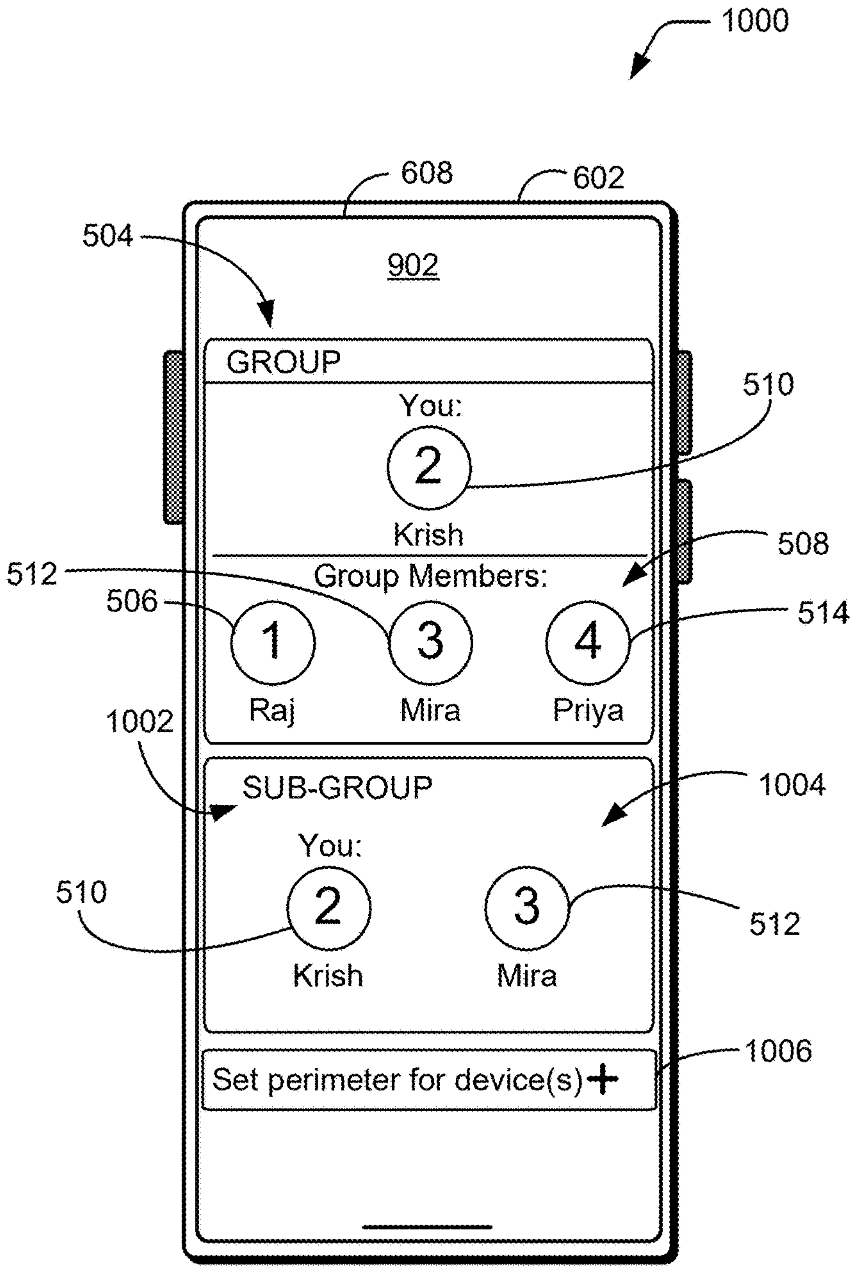

FIG. 10 illustrates an example 1000 of an implementation of subgroup device location coordination according to the techniques described herein. In this example 1000, the first external device 602 is shown and is established as the organizer of a subgroup via a group manager of the first external device 602. The group manager is similar to, or the same as, the group manager 114 described above. Although the first external device 602 is shown in this example 900, any of the mobile device 102, the first external device 602, the second external device 604, and/or the third external device 606 may be established as the organizer of a subgroup in a similar way (e.g., each of the devices includes a group manager similar to, or the same as, the group manager 114).

The establishment of the first external device 602 as the organizer of the subgroup occurs responsive to input applied to the subgroup generation button 906 shown by FIG. 9 and described above. In the example 1000, the user interface menu 902 displays a subgroup name 1002 associated with the subgroup, as well as subgroup devices 1004 included within the subgroup. The subgroup name 1002 can be modified by the user of the first external device 602 via the user interface menu 902. The user of the first external device 602 selects the devices to include within the subgroup from the devices included in the group managed by the mobile device 102. In at least one implementation, the first external device 602 can set a perimeter associated with one or more of the devices in the subgroup via set perimeter button 1006. In this example 1000, the subgroup includes the first external device 602 represented by the first managed device icon 510 and the second external device 604 represented by the second managed device icon 512. In other examples, however, the subgroup may include different or additional devices, along with the first managed device icon 510, such as the mobile device 102 and/or the third external device 606.

Figure 11:
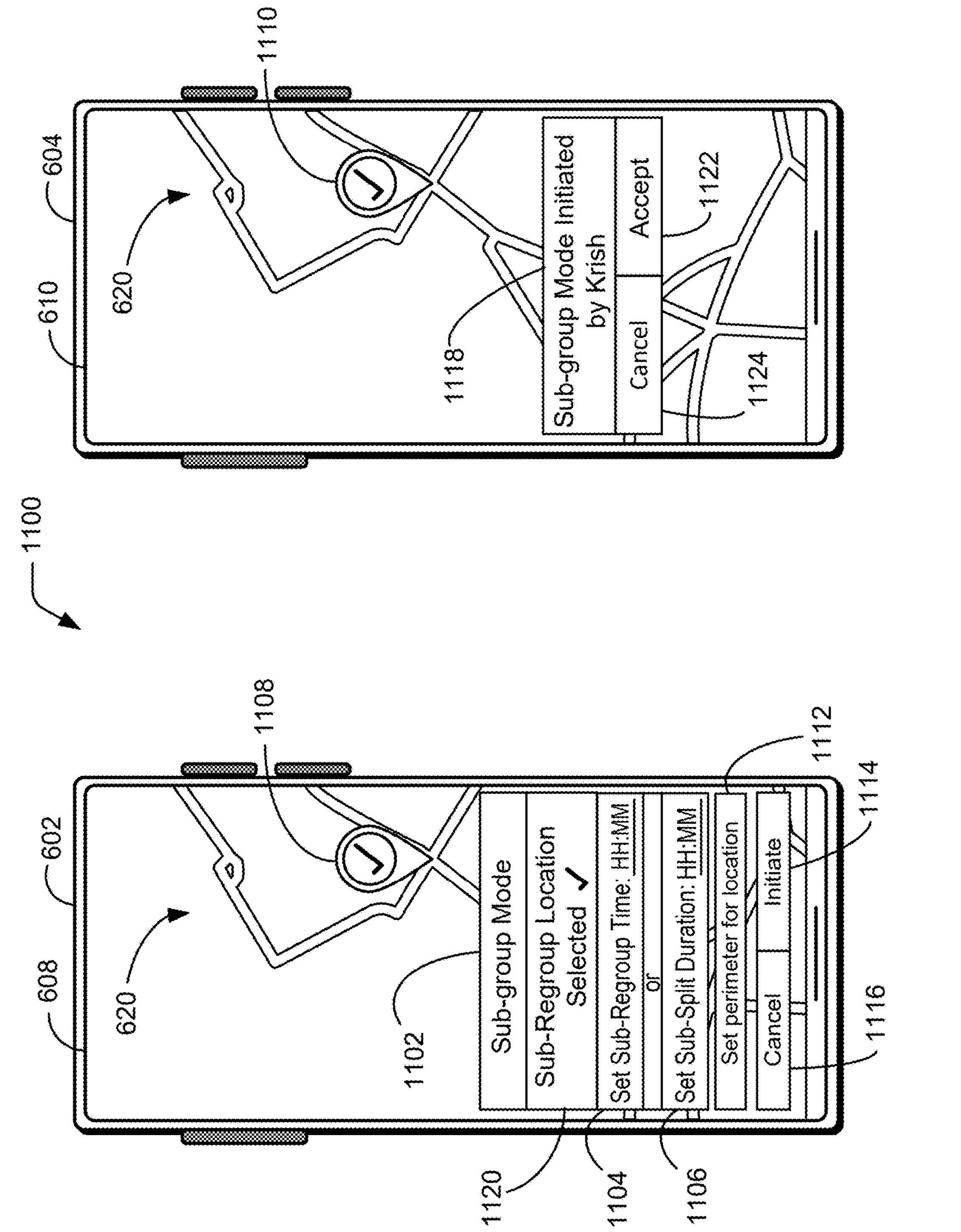
FIG. 11 illustrates subgroup device location coordination operations performed on various mobile devices in accordance with one or more implementations as described herein.

FIG. 11 illustrates an example 1100 of an implementation of subgroup device location coordination according to the techniques described herein. In this example 1100, the first external device 602 is shown along with the second external device 604. In this example 1100, the first external device 602 employs and/or implements the group manager of the first external device 602 to specify parameters for the subgroup including the first external device 602 and the second external device 604. Such parameters include one or more secondary meeting locations for the group, and a respective meeting time associated with each secondary meeting location. In some instances, the first external device 602 further employs the group manager to specify a perimeter associated with one or more of the secondary meeting locations. The parameters for the subgroup are specified via input applied through user interface 608. In particular, the user interface 608 is shown including a subgroup mode menu 1102, and input applied through the subgroup mode menu 1102 specifies the various subgroup parameters.

In this example, specifying the meeting time for a secondary meeting location includes inputting the meeting time as a Coordinated Universal Time via a subgroup regroup time selection menu 1104 of the subgroup mode menu 1102, or inputting a duration until the desired meeting time via a subgroup regroup duration selection menu 1106. The meeting time is stored in memory and is communicated to devices within the subgroup via a corresponding regroup indicator for the subgroup (e.g., from the device established as the organizer of the subgroup). The subgroup regroup indicator may include information similar to the regroup indicator 206. However, while the information included in the regroup indicator 206 describes meeting parameters for the group, the information included in the subgroup regroup indicator describes meeting parameters for the subgroup. A meeting time associated with a secondary meeting location may be referred to herein as a secondary meeting time.

In at least one implementation, a sequence of secondary meeting times and corresponding secondary meeting locations may be set via the subgroup mode menu 1102. Each secondary meeting location may be represented by a different icon in the map 620. In some instances, secondary meeting locations are specified by applying input to the map 620 (e.g., by selecting a location in the map 620 representing the location of the secondary meeting locations). In some instances, the secondary meeting locations are specified by inputting a name and/or address of each secondary meeting location. In this example, a selected location icon 1108 shown by the user interface 608 of the first external device 602 is displayed in the map 620 to represent a secondary meeting location. A selected location icon 1110 represents the secondary meeting location in the map 620 displayed by the user interface 610 of the second external device 604. In some instances, the secondary meeting location can be set to correspond to the location of the first external device 602, or corresponds to one of the other devices in the subgroup (e.g., the second external device 604) and may update according to a travel, movement, and/or updated location of the corresponding device.

A perimeter associated with the selected secondary meeting location may be specified via a set perimeter button 1112. In some instances, the perimeter may be specified according to a selected distance from the secondary meeting location (e.g., a radius of one kilometer around the secondary meeting location). The perimeter may have a circular shape, an elliptical shape, a rectangular shape, or any other shape. In some instances, the perimeter may be specified based on an input applied to the map 620 (e.g., such that the input applied to the map 620 draws and displays the perimeter on the map 620). The subgroup mode menu 1102 further includes an initiate button 1114 and a cancel button 1116. Following input of the meeting time and the secondary meeting location, an input applied to the initiate button 1114 causes the group manager of the first external device 602 to communicate the subgroup regroup indicator to each of the external devices in the subgroup. However, applying input to the cancel button 1116 removes the specified meeting time and secondary meeting location and exits the subgroup mode menu 1102.

Following communication of the subgroup regroup indicator to devices within the subgroup, each device may display a respective notification for acceptance or rejection of the specified subgroup meeting parameters. In the example 1100, second external device 604 is shown displaying a notification 1118 responsive to receiving the subgroup regroup indicator from the group manager of the first external device 602. Further, each device in the subgroup displays a respective icon indicating the secondary meeting location in the map 620. For example, the first external device 602 is shown displaying the icon 1108 via the user interface 608, and the second external device 604 is shown displaying the icon 1110 via the user interface 610. The subgroup mode menu 1102 indicates that the secondary meeting location has been specified via a subgroup location selection status indicator 1120. The second external device 604 can accept the subgroup meeting parameters via an accept button 1122, or reject the subgroup meeting parameters via a cancel button 1124.

Figure 12:
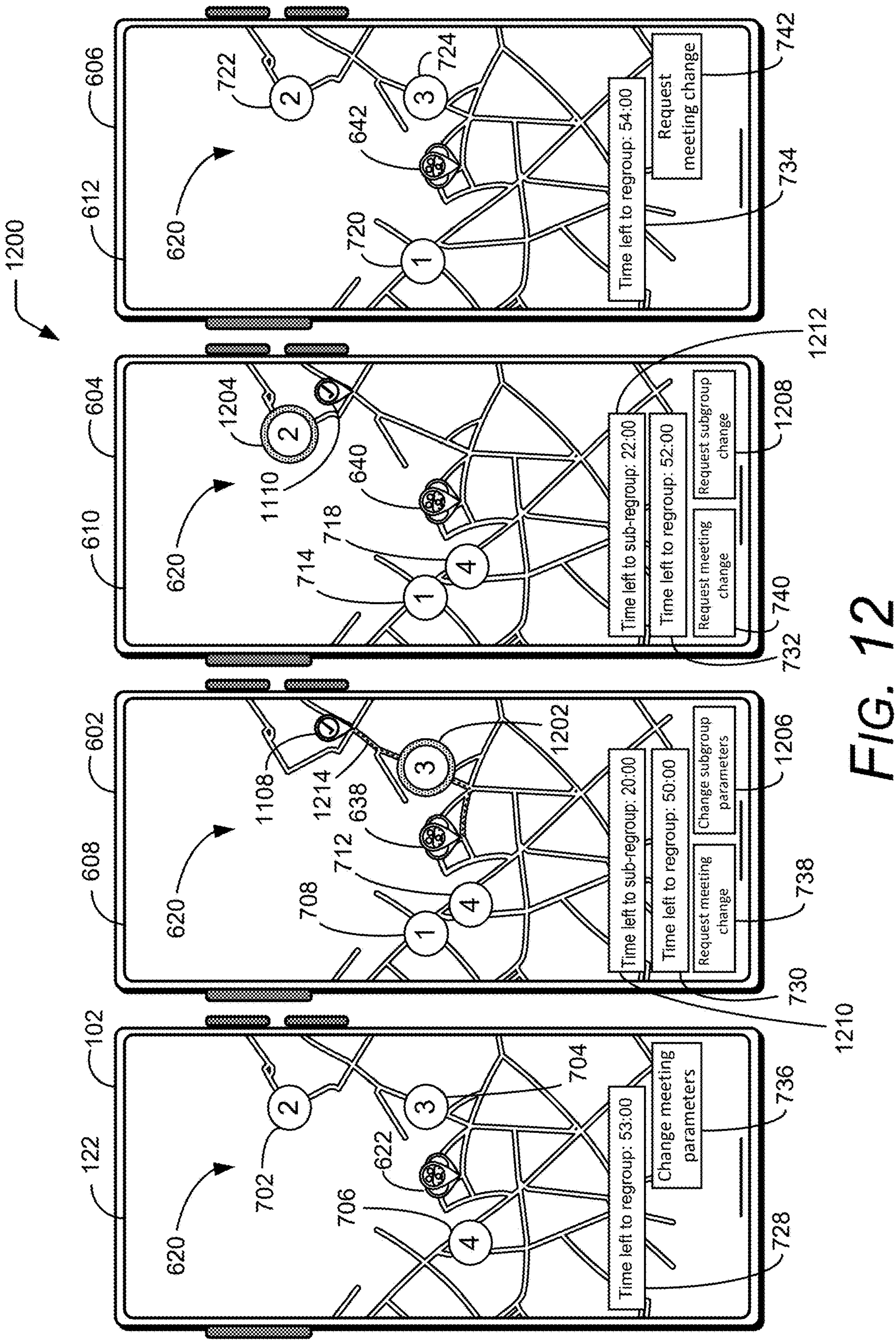
FIGS. 12-13 illustrate group and subgroup device location coordination operations performed on various mobile devices in accordance with one or more implementations as described herein.

FIG. 12 illustrates an example 1200 of an implementation of subgroup device location coordination according to the techniques described herein. In this example 1200, the first external device 602 is shown along with the mobile device 102, the second external device 604, and the third external device 606. The group manager of the first external device 602 tracks the location of each device included in the subgroup relative to the one or more secondary meeting locations, and at each device in the subgroup, the location of each device in the subgroup is displayed via the map 620. For example, the first external device 602 tracks the location of the second external device 604 relative to the secondary meeting location specified by the input applied to the subgroup mode menu 1102 shown in FIG. 11. The tracked location of the second external device 604 is represented by a second managed device icon 1202 in map 620 displayed by the first external device 602.

In this example 1200, the appearance of the second managed device icon 1202 is different than the appearance of other icons representing the other devices in the map 620 that are not included in the subgroup. For example, the appearance of a second managed device icon 1202 is different than the appearance of the managing device icon 708 representing the mobile device 102. The different appearance of the second managed device icon 1202 relative to the other icons indicates that the device represented by the second managed device icon 1202 (in this example, the second external device 604) is included in the subgroup. In the example 1200, the different appearance of the second managed device icon 1202 is indicated by a fill ring surrounding the second managed device icon 1202. However, in other examples, a different type of appearance may be used (e.g., a different icon size, fill, stroke, orientation, and so forth). Similarly, the second external device 604 displays a first managed device icon 1204 in the map 620, where the first managed device icon 1204 represents the location of the first external device 602.

In the example 1200, each device in the subgroup includes a respective user interface element that can be selected to request changes to the subgroup meeting parameters from the group manager of the device established as the organizer of the subgroup. In this example 1200, the organizer of the subgroup is the first external device 602. The user interface 608 of the first external device 602 displays a subgroup update button 1206 which can be selected to update the subgroup meeting parameters. The user interface 610 of the second external device 604 displays a subgroup change request button 1208, which can be selected to request changes to the meeting parameters for the subgroup. Changes to the meeting parameters for the subgroup that may be requested may include, for example, changes to the meeting time for the subgroup, changes to one or more secondary meeting locations for the subgroup, changes to which devices are included in the subgroup, and/or changes to perimeters set for one or more devices in the subgroup and/or perimeters associated with one or more secondary meeting locations.

In the example 1200, requests for changes to the subgroup parameters communicated from the second external device 604 are received by the first external device 602, and the changes are accepted or rejected responsive to input applied to the first external device 602 through user interface 608. Similar to the example of the group described above, during conditions in which additional devices are included in the subgroup, voting from respective users of the devices in the subgroup may be implemented to determine whether requested changes are accepted or rejected. In some instances, the group manager of each device included in the subgroup supports text messaging communications between individual devices included in the subgroup and/or text messaging communications that can be received by all devices included in the subgroup.

Each device in the subgroup displays a respective subgroup meeting time indicator. A time displayed by the subgroup meeting time indicator is based on the current location of the device and/or a route from the device to the next secondary meeting location (e.g., in a sequence of secondary meeting locations), as well as the designated subgroup meeting time associated with the next secondary meeting location. The subgroup meeting time indicators display a time remaining until the devices in the subgroup are to begin returning to the next secondary meeting location. For example, the first external device 602 displays a subgroup meeting time indicator 1210 which includes a time remaining (e.g., twenty minutes) until the first external device 602 is alerted via the subgroup regroup indicator to return to the next secondary meeting location. The second external device 604 displays a subgroup meeting time indicator 1212 including a time remaining (e.g., twenty-two minutes) until the second external device 604 is alerted via the subgroup regroup indicator to return to the next secondary meeting location. The remaining time displayed by each subgroup meeting time indicator may be different for each device, based on the locations of the devices relative to the next secondary meeting location (e.g., the secondary meeting location indicated by the selected location icon 1108 and the selected location icon 1110). As a device travels farther from the next secondary meeting location, the time remaining indicated by the corresponding subgroup meeting time indicator may decrease, and as the device travels closer to the next secondary meeting location, the time remaining indicated by the corresponding subgroup meeting time indicator may increase.

In at least one implementation, the group manager of the first external device 602 determines a route 1214 between the secondary meeting location of the subgroup (indicated by selected location icon 1108) and the geographical meeting location of the group (indicated by icon 638). Based on the route 1214, the group manager may automatically update the designated meeting time for regroup of the subgroup at the secondary meeting location and communicate an updated subgroup regroup indicator to each device included in the subgroup. The updated subgroup regroup indicator includes the updated designated meeting time. As one example, during conditions in which the secondary meeting location is relatively far from the geographical meeting location, the route 1214 may be longer, and during conditions in which the secondary meeting location is relatively close to the geographical meeting location, the route 1214 may be shorter.

If the route 1214 is sufficiently long such that a duration to travel from the secondary meeting location to the geographical meeting location approaches and/or exceeds a duration between the meeting time associated with the secondary meeting location and the meeting time associated with the geographical meeting location, the group manager of the first external device 602 updates the meeting time for regroup of the subgroup at the secondary meeting location. Updating the meeting time may include, for example, advancing the meeting time (e.g., automatically setting the meeting time associated with the secondary meeting location to an earlier time). Updating the meeting time in this way lengthens the duration between the meeting time associated with the secondary meeting location and the meeting time associated with the geographical meeting location to provide for additional travel time between the secondary meeting location and the geographical meeting location.

Figure 13:
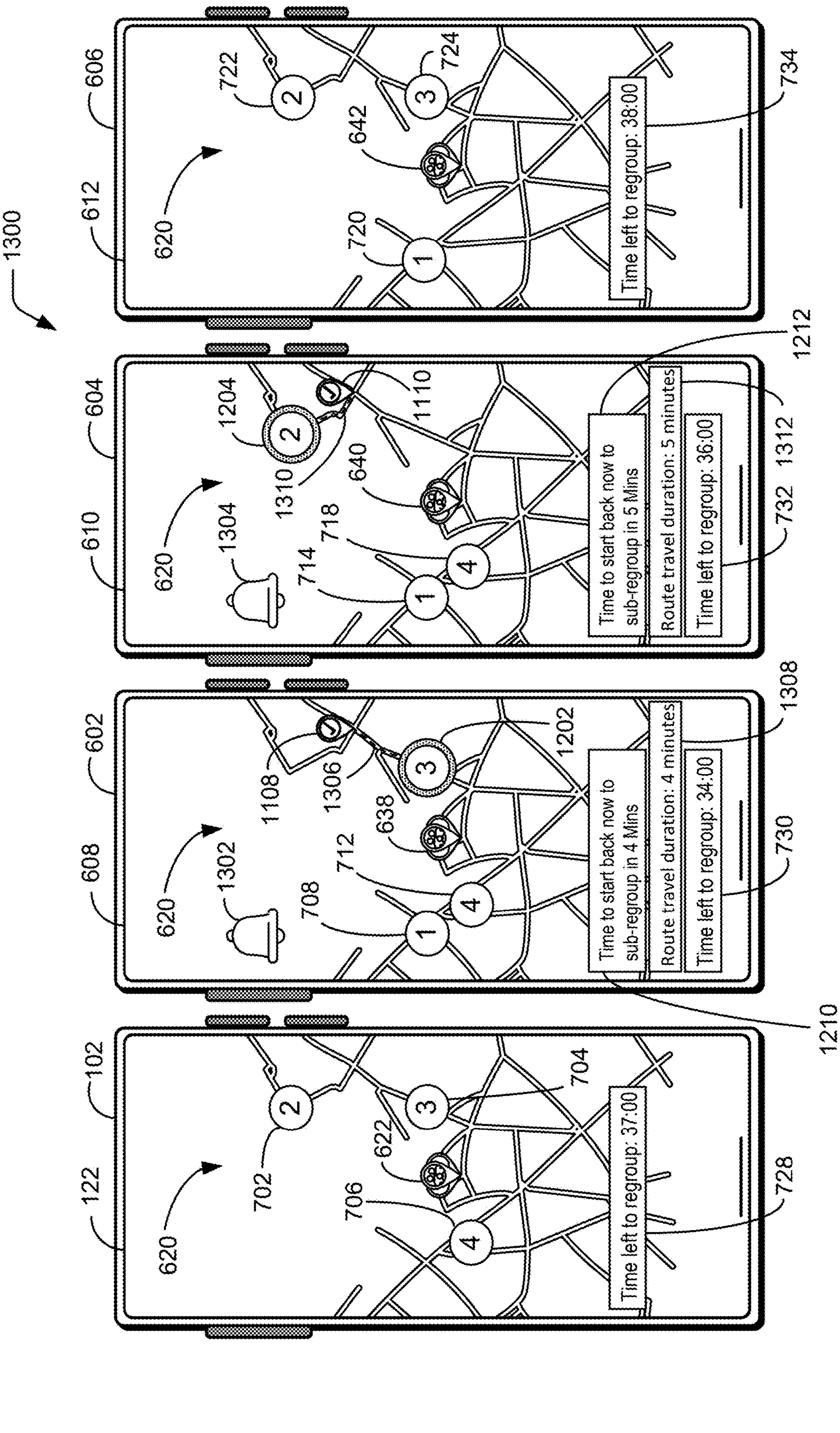

FIG. 13 illustrates an example 1300 of an implementation of subgroup device location coordination according to the techniques described herein. The first external device 602 is shown along with the mobile device 102, the second external device 604, and the third external device 606. In this example 1300, sufficient time has elapsed following the example 1200 described above with reference to FIG. 12 to cause the subgroup regroup indicator to output alerts to the devices included within the subgroup to return to the secondary meeting location indicated by the selected location icon 1108 and the selected location icon 1110. In particular, the subgroup regroup indicator causes the first external device 602 to output and/or display a subgroup regroup alert 1302. The subgroup regroup indicator additionally causes the second external device 604 to output and/or display a subgroup regroup alert 1304. The subgroup regroup alert 1302 and/or subgroup regroup alert 1304 may also be referred to herein as a subgroup regroup indication. The group manager of the first external device 602 generates and displays a route between the current location of the first external device 602 and the secondary meeting location via the route guide 1306. A duration to travel the route indicated by the route guide 1306 is displayed via the travel duration indicator 1308.

Each external device in the subgroup also displays corresponding indicators similar to those described above. For example, second external device 604 displays a route between the second external device 604 and the secondary meeting location via the route guide 1310. A duration to travel the route indicated by the route guide 1310 is displayed via the travel duration indicator 1312.

In at least one implementation, one or more of the devices additionally display directions to travel the routes indicated by the respective route guides. Such directions may include, for example, textual directions such as instructions to turn at particular roads, landmarks, etc. As a device travels toward the secondary meeting location along the respective route associated with the device, the travel duration indicator of the device updates to display an updated duration to travel the route (e.g., as the distance between the device and the secondary meeting location decreases, the indicated duration to travel the route decreases). In at least one implementation, the icons representing the devices within the subgroup update as the devices return toward the secondary meeting location (e.g., the position of the icons in the map 620 update to indicate the travel of the devices toward the secondary meeting location).

Example methods 1400, 1500, 1600, 1700, and 1800 are described with reference to respective FIGS. 14, 15, 16, 17, and 18 in accordance with one or more implementations of group and subgroup device location coordination, as described herein. Generally, any services, components, modules, managers, controllers, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 14:
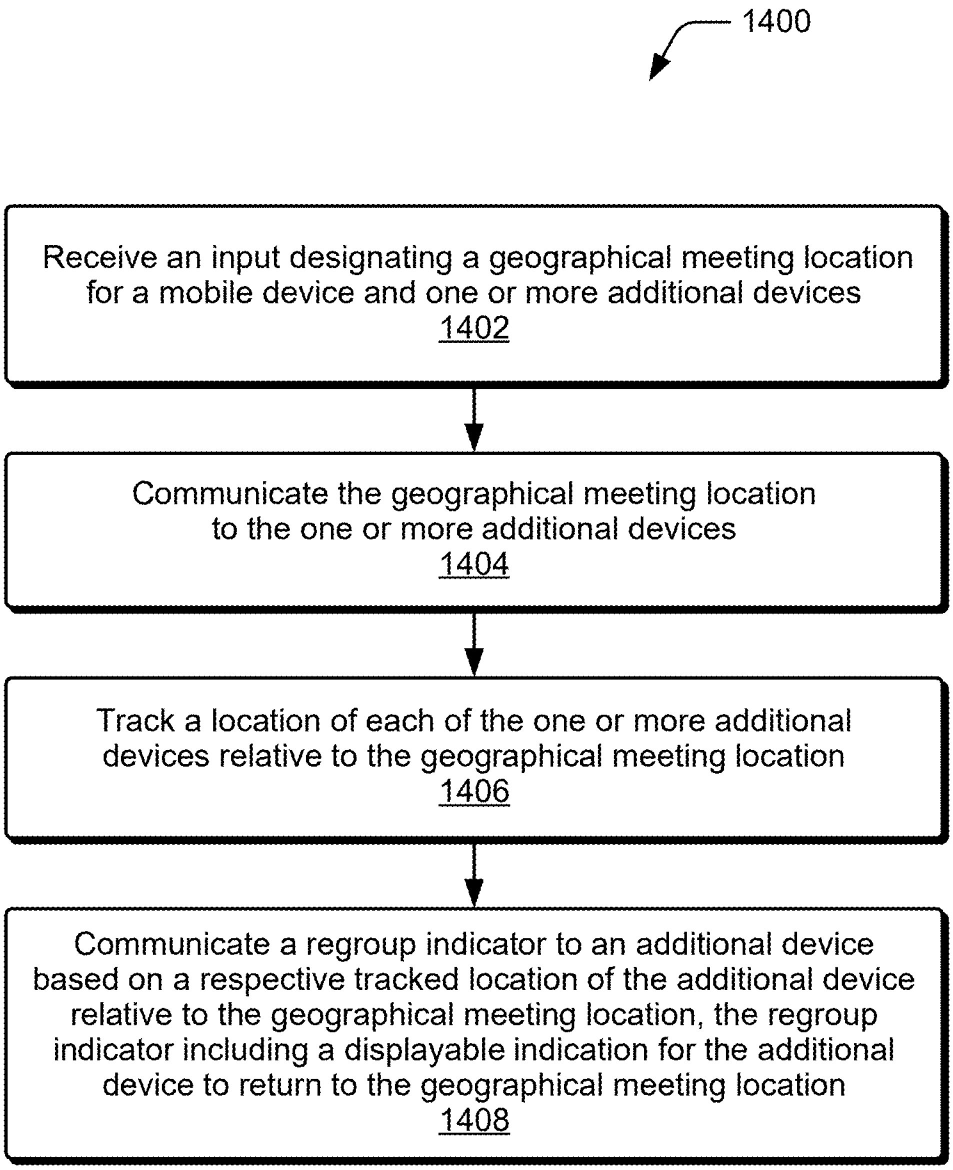
FIGS. 14-16 illustrate example methods for group device location coordination in accordance with one or more implementations of the techniques described herein.

FIG. 14 illustrates example method(s) 1400 for group device location coordination. The order in which the method is described is not intended to be construed as a limitation, and any number or combination of the described method operations may be performed in any order to perform a method, or an alternate method.

At 1402, an input designating a geographical meeting location for a mobile device and one or more additional devices is received. For example, the input 204 is received by the group manager 114 of the mobile device 102 to designate the geographical meeting location 208 indicated by the icon 622 for the mobile device 102, the first external device 602, the second external device 604, and the third external device 606.

At 1404, the geographical meeting location is communicated to the one or more additional devices. For example, the group manager 114 communicates the geographical meeting location 208 to the first external device 602, the second external device 604, and the third external device 606.

At 1406, a location of each of the one or more additional devices is tracked relative to the geographical meeting location. For example, the group manager 114 of the mobile device 102 tracks the locations of the first external device 602, the second external device 604, and the third external device 606 via GPS, UWB, etc. as the location data 130, and maintains the location data 130 in memory 110.

At 1408, a regroup indicator is communicated to an additional device based on a respective tracked location of the additional device relative to the geographical meeting location, where the regroup indicator includes a displayable indication for the additional device to return to the geographical meeting location. For example, the group manager 114 of the mobile device 102 communicates the regroup indicator 206 to the first external device 602, the second external device 604, and/or the third external device 606, with the regroup indicator 206 including the displayable regroup indication 212. The displayable regroup indication 212 may be output by the first external device 602 as the regroup alert 804, as one example.

Figure 15:
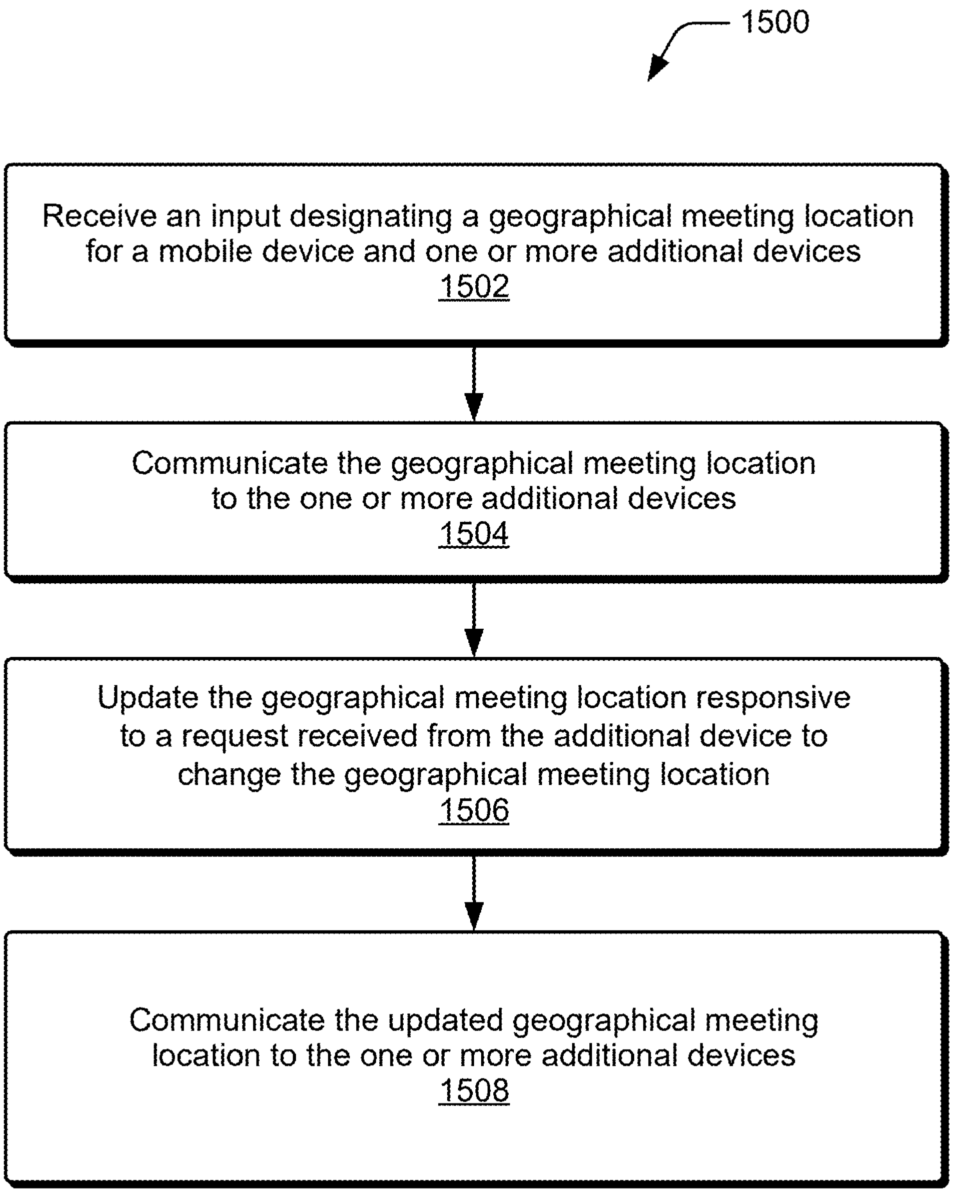

FIG. 15 illustrates example method(s) 1500 for group device location coordination. The order in which the method is described is not intended to be construed as a limitation, and any number or combination of the described method operations may be performed in any order to perform a method, or an alternate method.

At 1502, an input designating a geographical meeting location for a mobile device and one or more additional devices is received. For example, the input 204 is received by the group manager 114 of the mobile device 102 to designate the geographical meeting location 208 indicated by the icon 622 for the mobile device 102, the first external device 602, the second external device 604, and the third external device 606.

At 1504, the geographical meeting location is communicated to the one or more additional devices. For example, the group manager 114 communicates the geographical meeting location 208 to the first external device 602, the second external device 604, and the third external device 606.

At 1506, the geographical meeting location is updated responsive to a request received from the additional device to change the geographical meeting location. For example, the meeting change request button 738 displayed by the first external device 602 receives input to communicate the meeting update request 222 to the mobile device 102 including the requested meeting location 224.

At 1508, the updated geographical meeting location is communicated to the one or more additional devices. For example, responsive to accepting the meeting update request 222, the group manager 114 of the mobile device 102 updates the geographical meeting location 208 and the regroup indicator 206, and communicates the updated geographical meeting location and the regroup parameter to at least the first external device 602.

Figure 16:
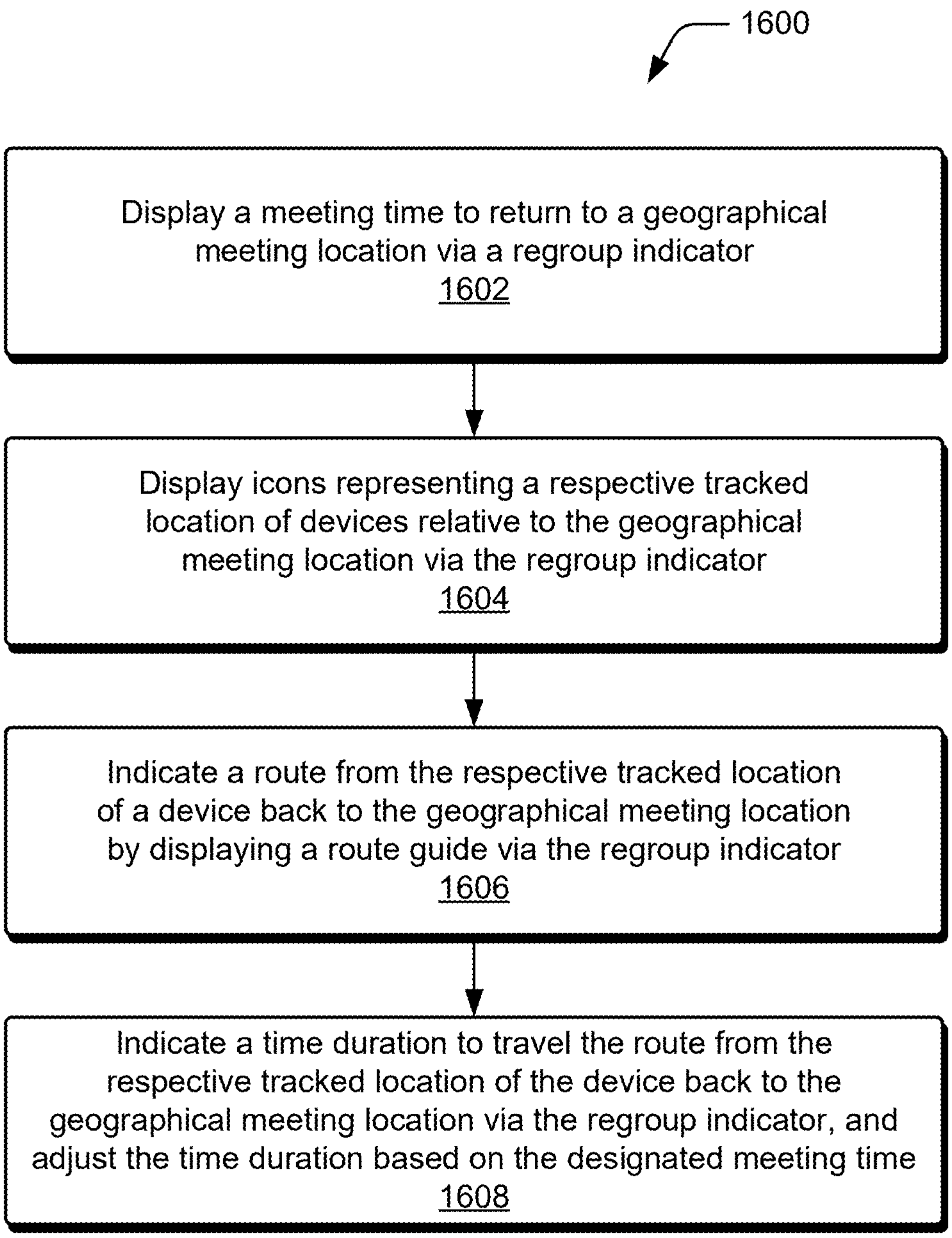

FIG. 16 illustrates example method(s) 1600 for group device location coordination. The order in which the method is described is not intended to be construed as a limitation, and any number or combination of the described method operations may be performed in any order to perform a method, or an alternate method.

At 1602, a meeting time to return to a geographical meeting location via a regroup indicator is displayed. For example, the first external device 602, via the regroup indicator 206, displays the time indicator 730 to return to the geographical meeting location represented by the icon 638.

At 1604, icons representing a respective tracked location of devices relative to the geographical meeting location are displayed via the regroup indicator. For example, the first external device 602, via the regroup indicator 206, displays the managing device icon 708, the second managed device icon 710, and the third managed device icon 712 in relation to the geographical meeting location represented by icon 638.

At 1606, a route from the respective tracked location of a device back to the geographical meeting location is indicated by displaying a route guide via the regroup indicator. For example, the first external device 602, via the regroup indicator 206, displays the route guide 822 between the current position icon 816 representing the location of the first external device 602 and the geographical meeting location represented by the icon 638.

At 1608, a time duration to travel the route from the respective tracked location of the device back to the geographical meeting location is indicated via the regroup indicator, and the time duration is adjusted based on the designated meeting time. For example, the first external device 602, via the regroup indicator 206, displays the time indicator 730 which displays the duration remaining until the designated meeting time and the duration in which the route should be traveled for the first external device 602 to arrive at the geographical meeting location at the designated meeting time. The estimated time to travel the route is indicated by travel duration indicator 828, and as the current time approaches the designated meeting time, the duration indicated by the time indicator 730 decreases.

Figure 17:
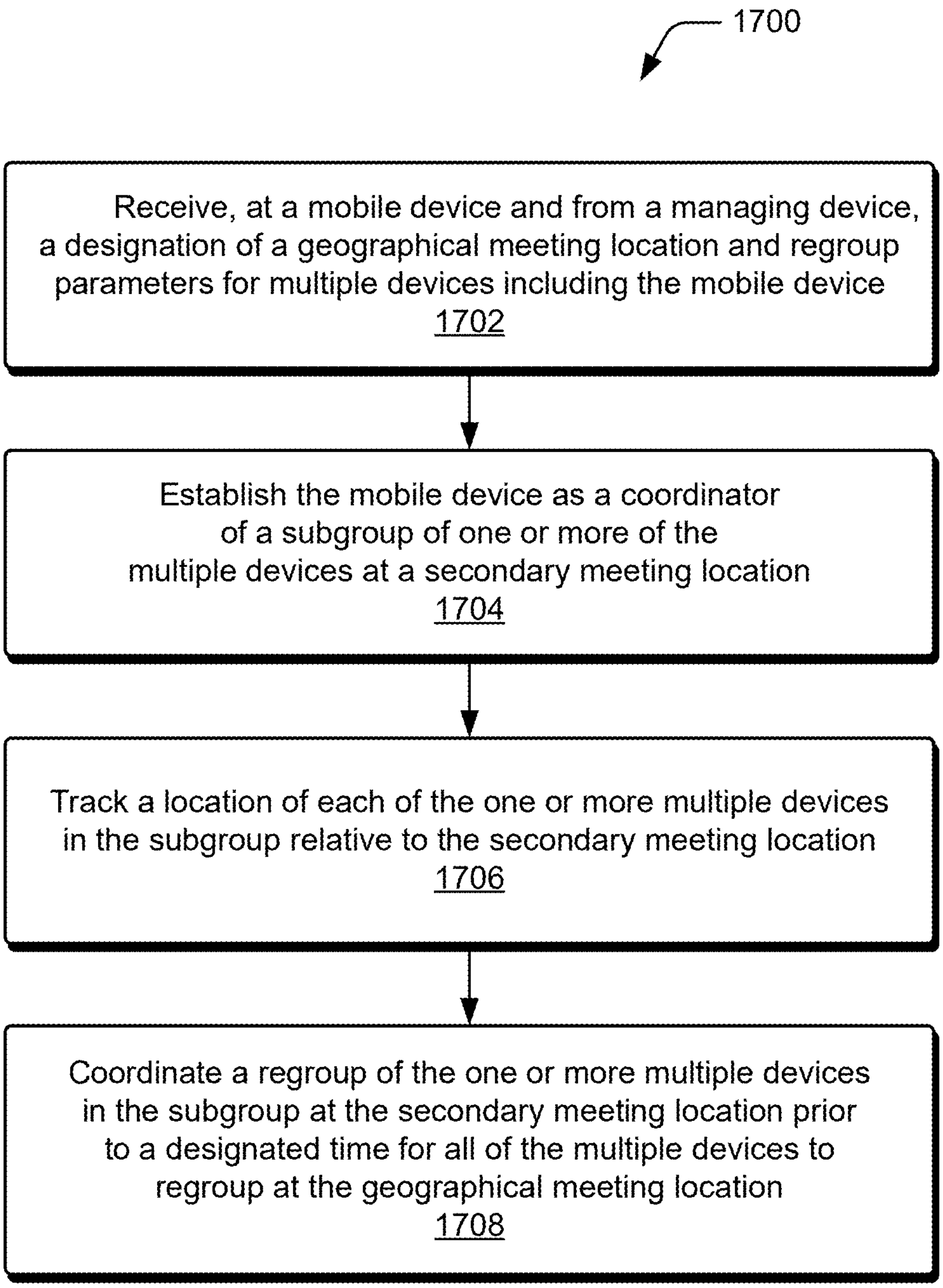
FIGS. 17 and 18 illustrate example methods for subgroup device location coordination in accordance with one or more implementations of the techniques described herein.

FIG. 17 illustrates example method(s) 1700 for subgroup device location coordination. The order in which the method is described is not intended to be construed as a limitation, and any number or combination of the described method operations may be performed in any order to perform a method, or an alternate method.

At 1702, a designation of a geographical meeting location and regroup parameters for multiple devices including a mobile device is received at the mobile device from a managing device. For example, the input 204 is received by the group manager 114 of the mobile device 102, which in this example is the managing device, to designate the geographical meeting location 208 communicated to at least the external device 202. Further, the regroup parameters are communicated to the external device 202 via the regroup indicator 206. The external device 202 may be the first external device 602.

At 1704, the mobile device is established as a coordinator of a subgroup of one or more of the multiple devices at a secondary meeting location. For example, the first external device 602 is established as the coordinator of a subgroup including the subgroup devices 1004, and a secondary meeting location represented by the selected location icon 1108 is designated by the first external device 602.

At 1706, a location of each of the one or more multiple devices in the subgroup is tracked relative to the secondary meeting location. For example, a location of the second external device 604 is tracked by the first external device 602 and is represented by the second managed device icon 1202.

At 1708, a regroup of the one or more multiple devices in the subgroup at the secondary meeting location is coordinated prior to a designated time for all of the multiple devices to regroup at the geographical meeting location. For example, the subgroup regroup indicator communicated to the second external device 604 by the first external device 602 causes the second external device 604 to output the subgroup regroup alert 1304. The subgroup regroup alert 1304 provides an indication for the second external device 604 to return to the secondary meeting location represented by the selected location icon 1110 via the user interface 610 of the second external device 604.

Figure 18:
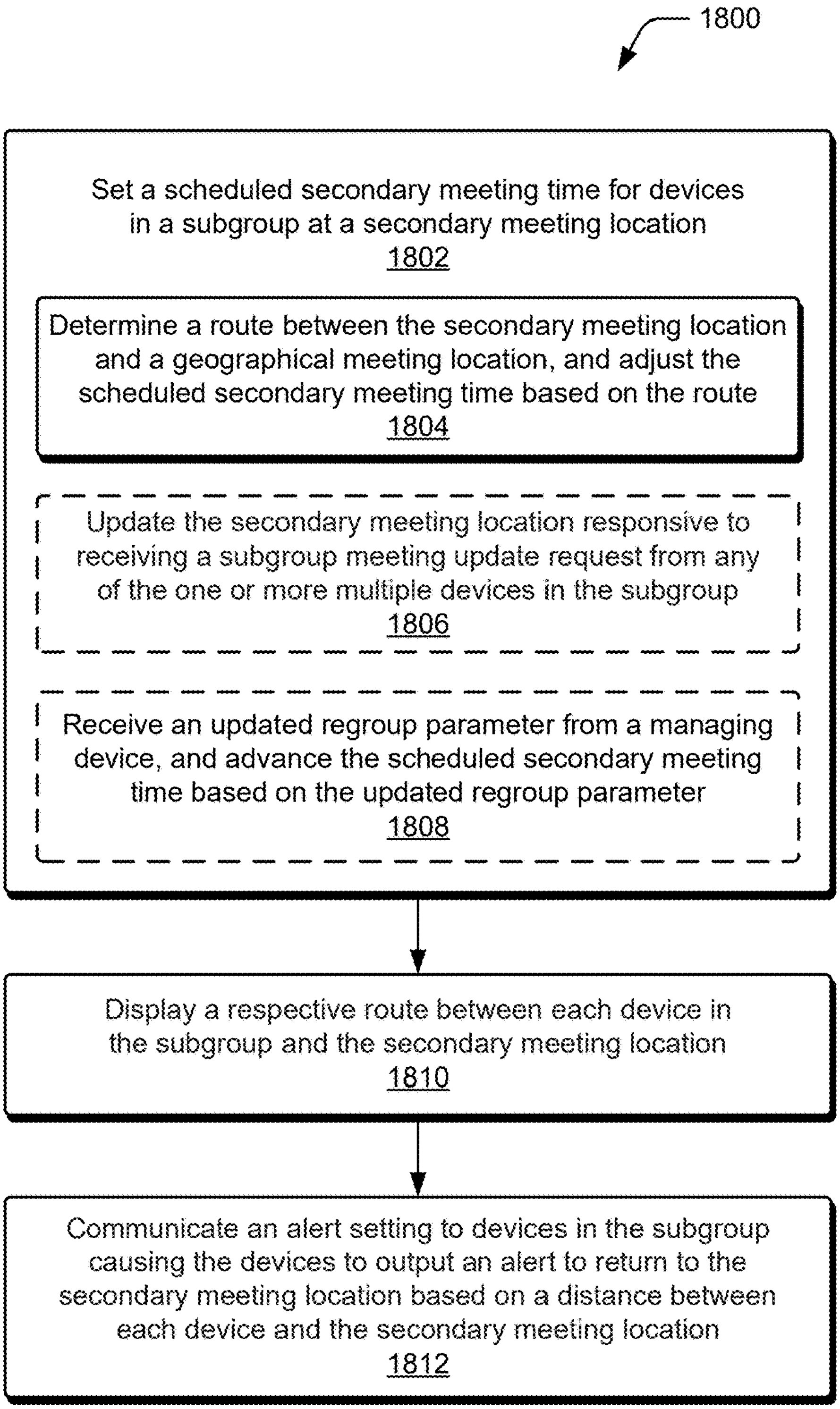

FIG. 18 illustrates example method(s) 1800 for subgroup device location coordination. The order in which the method is described is not intended to be construed as a limitation, and any number or combination of the described method operations may be performed in any order to perform a method, or an alternate method.

At 1802, a scheduled secondary meeting time is set for devices in a subgroup at a secondary meeting location. For example, first external device 602 sets the scheduled secondary meeting time for the subgroup including the second external device 604 via the subgroup regroup time selection menu 1104 or the subgroup regroup duration selection menu 1106 in the user interface 608 of the first external device 602.

At 1804, a route between the secondary meeting location and a geographical meeting location is determined, and the scheduled secondary meeting time is adjusted based on the route. For example, the route 1214 is determined, and the meeting time associated with the secondary meeting location represented by the selected location icon 1108 is adjusted (e.g., updated) based on the route 1214.

At 1806, the secondary meeting location is updated responsive to receiving a subgroup meeting update request from any of the one or more multiple devices in the subgroup. For example, an input is provided via the subgroup change request button 1208 displayed by the user interface 610 of the second external device 604 to communicate a request to the first external device 602 to update the secondary meeting location represented by the selected location icon 1108 and the selected location icon 1110.

At 1808, an updated regroup parameter is received from a managing device, and the scheduled secondary meeting time is advanced based on the updated regroup parameter. For example, mobile device 102, established as the managing device of the group that includes the first external device 602, updates the geographical meeting location and/or the meeting time associated with the geographical meeting location responsive to input applied via the update button 736. Based on the updated geographical meeting location and/or the updated meeting time, the first external device 602 advances the meeting time associated with the secondary meeting location, such as to provide additional time for travel of at least the first external device 602 to the geographical meeting location after the regrouping of the subgroup at the secondary meeting location.

At 1810, a respective route between each device in the subgroup and the secondary meeting location is displayed. For example, the route guide 1306 is displayed via the user interface 608 of the first external device 602 to indicate the route for the first external device 602 to travel to the secondary meeting location. Further, the route guide 1310 is displayed via the user interface 610 of the second external device 604 to indicate the route for the second external device 604 to travel to the secondary meeting location.

At 1812, an alert setting is communicated to devices in the subgroup causing the devices to output an alert to return to the secondary meeting location based on a distance between each device and the secondary meeting location. For example, the subgroup regroup indicator communicated to the devices within the subgroup includes the alert setting as instructions that, when executed, cause the devices to output the alert. As one example, the second external device 604 outputs the output subgroup regroup alert 1304, the subgroup meeting time indicator 1212, and the travel duration indicator 1312.

Figure 19:
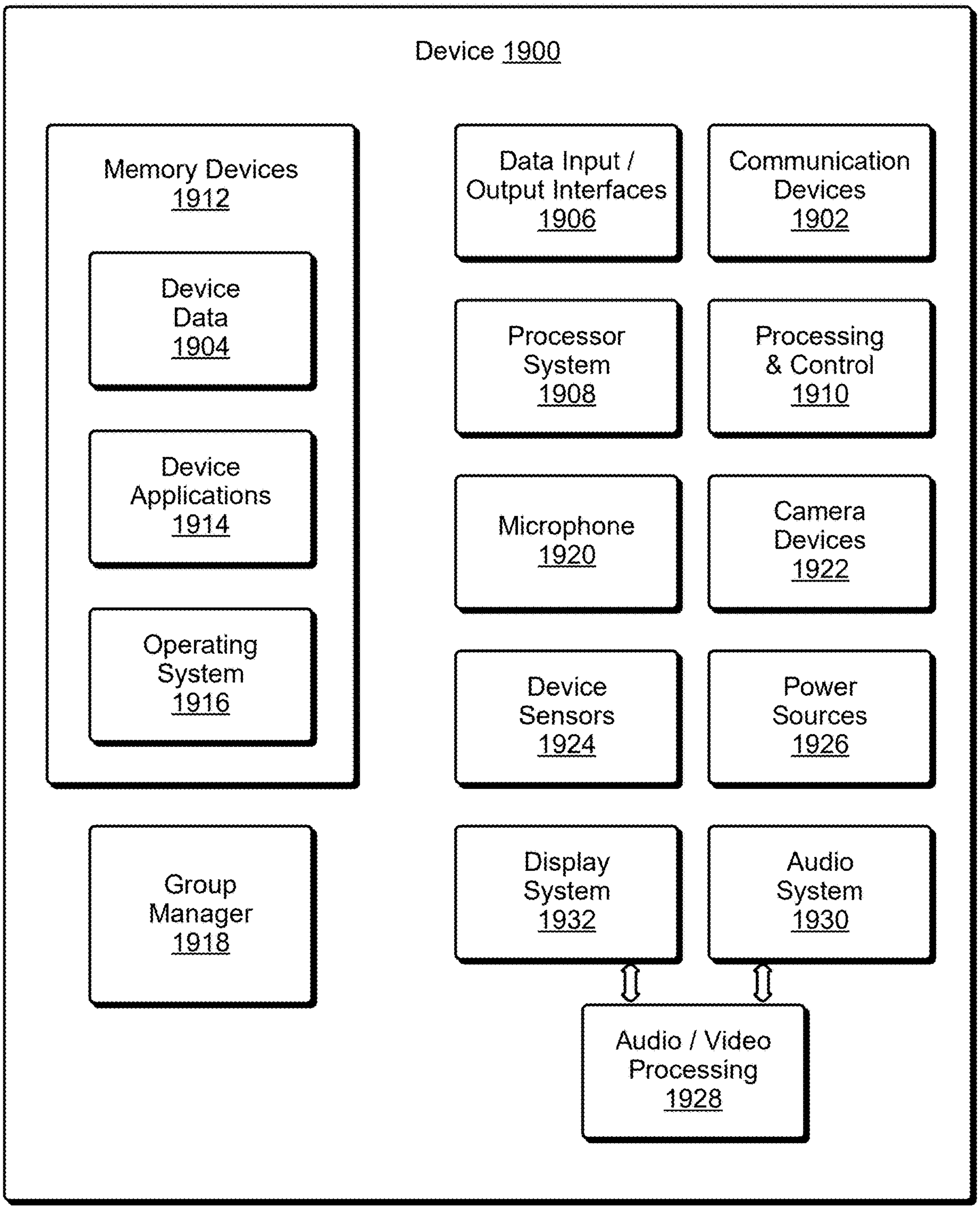
FIG. 19 illustrates various components of an example device that may be used to implement the techniques for group and subgroup device location coordination as described herein.

FIG. 19 illustrates various components of an example device 1900, which can implement aspects of the techniques and features for group and subgroup device location coordination, as described herein. The example device 1900 may be implemented as any of the devices described with reference to the previous FIGS. 1-18, such as any type of a wireless device, mobile device, mobile phone, flip phone, client device, companion device, display device, tablet, computing, communication, entertainment, gaming, media playback, and/or any other type of computing, consumer, and/or electronic device. For example, the mobile device 102 described with reference to FIGS. 1-18 may be implemented as the example device 1900.

The example device 1900 can include various, different communication devices 1902 that enable wired and/or wireless communication of device data 1904 with other devices. The device data 1904 can include any of the various devices data and content that is generated, processed, determined, received, stored, and/or communicated from one computing device to another. Generally, the device data 1904 can include any form of audio, video, image, graphics, and/or electronic data that is generated by applications executing on a device. The communication devices 1902 can also include transceivers for cellular phone communication and/or for any type of network data communication.

The example device 1900 can also include various, different types of data input/output (I/O) interfaces 1906, such as data network interfaces that provide connection and/or communication links between the devices, data networks, and other devices. The data I/O interfaces 1906 may be used to couple the device to any type of components, peripherals, and/or accessory devices, such as a computer input device that may be integrated with the example device 1900. The I/O interfaces 1906 may also include data input ports via which any type of data, information, media content, communications, messages, and/or inputs may be received, such as user inputs to the device, as well as any type of audio, video, image, graphics, and/or electronic data received from any content and/or data source.

The example device 1900 includes a processor system 1908 of one or more processors (e.g., any of microprocessors, controllers, and the like) and/or a processor and memory system implemented as a system-on-chip (SoC) that processes computer-executable instructions. The processor system 1908 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device may be implemented with any one or combination of software, hardware, firmware, or fixed logic circuitry that may be implemented in connection with processing and control circuits, which are generally identified at 1910. The example device 1900 may also include any type of a system bus or other data and command transfer system that couples the various components within the device. A system bus can include any one or combination of different bus structures and architectures, as well as control and data lines.

The example device 1900 also includes memory and/or memory devices 1912 (e.g., computer-readable storage memory) that enable data storage, such as data storage devices implemented in hardware which may be accessed by a computing device, and that provide persistent storage of data and executable instructions (e.g., software applications, programs, functions, and the like). Examples of the memory devices 1912 include volatile memory and non-volatile memory, fixed and removable media devices, and any suitable memory device or electronic data storage that maintains data for computing device access. The memory devices 1912 can include various implementations of random-access memory (RAM), read-only memory (ROM), flash memory, and other types of storage media in various memory device configurations. The example device 1900 may also include a mass storage media device.

The memory devices 1912 (e.g., as computer-readable storage memory) provide data storage mechanisms, such as to store the device data 1904, other types of information and/or electronic data, and various device applications 1914 (e.g., software applications and/or modules). For example, an operating system 1916 may be maintained as software instructions with a memory device 1912 and executed by the processor system 1908 as a software application. The device applications 1914 may also include a device manager, such as any form of a control application, software application, signal-processing and control module, code that is specific to a particular device, a hardware abstraction layer for a particular device, and so on.

In this example, the device 1900 includes a group manager 1918 that implements various aspects of the described features and techniques described herein. The group manager 1918 may be implemented with hardware components and/or in software as one of the device applications 1914, such as when the example device 1900 is implemented as the mobile device 102 described with reference to FIGS. 1-18. An example of the group manager 1918 is the group manager 114 implemented by the mobile device 102, such as a software application and/or as hardware components in the mobile device. In implementations, the group manager 1918 may include independent processing, memory, and logic components as a computing and/or electronic device integrated with the example device 1900.

The example device 1900 can also include a microphone 1920 and/or camera devices 1922, as well as device sensors 1924, such as may be implemented as components of an inertial measurement unit (IMU). The device sensors 1924 may be implemented with various sensors, such as a gyroscope, an accelerometer, and/or other types of motion sensors to sense motion of the device. The device sensors 1924 can generate sensor data vectors having three-dimensional parameters (e.g., rotational vectors in x, y, and z-axis coordinates) indicating location, position, acceleration, rotational speed, and/or orientation of the device. The example device 1900 can also include one or more power sources 1926, such as when the device is implemented as a wireless device and/or a mobile device. The power sources may include a charging and/or power system, and may be implemented as a flexible strip battery, a rechargeable battery, a charged super-capacitor, and/or any other type of active or passive power source.

The example device 1900 can also include an audio and/or video processing system 1928 that generates audio data for an audio system 1930 and/or generates display data for a display system 1932. The audio system and/or the display system may include any types of devices or modules that generate, process, display, and/or otherwise render audio, video, display, and/or image data. Display data and audio signals may be communicated to an audio component and/or to a display component via any type of audio and/or video connection or data link. In implementations, the audio system and/or the display system are integrated components of the example device 1900. Alternatively, the audio system and/or the display system are external, peripheral components to the example device.

Although implementations for group and subgroup device location coordination have been described in language specific to features and/or methods, the appended claims are not necessarily limited to the specific features or methods described. Rather, the specific features and methods are disclosed as example implementations for group and subgroup device location coordination, and other equivalent features and methods are intended to be within the scope of the appended claims. Further, various different examples are described, and it is to be appreciated that each described example may be implemented independently or in connection with one or more other described examples. Additional aspects of the techniques, features, and/or methods discussed herein relate to one or more of the following:

In some aspects, the techniques described herein relate to a mobile device, including: at least one processor coupled with a memory; and a group manager configured to cause the mobile device to: receive an input designating a geographical meeting location for the mobile device and one or more additional devices; communicate the geographical meeting location to the one or more additional devices; track a location of each of the one or more additional devices relative to the geographical meeting location; and communicate a regroup indicator to an additional device based on a respective tracked location of the additional device relative to the geographical meeting location, the regroup indicator including a displayable indication for the additional device to return to the geographical meeting location.

Alternatively, or in addition to the above-described mobile device, any one or combination of: the regroup indicator includes a displayable meeting time to return to the geographical meeting location. The meeting time is formatted as at least one of a Coordinated Universal Time or a time duration. The group manager is configured to cause the mobile device to update the geographical meeting location responsive to a meeting location update request received from any of the one or more additional devices. The regroup indicator includes a displayable route guide indicating a route from the tracked location of the additional device back to the geographical meeting location. The regroup indicator includes an indication of a time duration to travel the route from the tracked location of the additional device back to the geographical meeting location. The time duration to travel the route is based at least in part on a designated meeting time set by the mobile device via the group manager to regroup the one or more additional devices at the geographical meeting location. The regroup indicator includes displayable icons corresponding to the one or more additional devices, the displayable icons representing the respective tracked location of each of the one or more additional devices relative to the geographical meeting location. The geographical meeting location corresponds to a current geographical location of the mobile device, and wherein the group manager is configured to cause the mobile device to: update the geographical meeting location to the current geographical location of the mobile device; and communicate the updated geographical meeting location to the one or more additional devices. The input designates an additional geographical meeting location for the mobile device and the one or more additional devices, and wherein the group manager is configured to cause the mobile device to: communicate the additional geographical meeting location to the one or more additional devices; track the location of each of the one or more additional devices relative to the additional geographical meeting location; and communicate an additional regroup indicator to the additional device based on the respective tracked location of the additional device relative to the additional geographical meeting location, the additional regroup indicator including a displayable indication for the additional device to return to the additional geographical meeting location along a route including the geographical meeting location and the additional geographical meeting location.

In some aspects, the techniques described herein relate to a method, including: receiving an input designating a geographical meeting location for the mobile device and one or more additional devices; communicating the geographical meeting location to the one or more additional devices; tracking a location of each of the one or more additional devices relative to the geographical meeting location; and communicating a regroup indicator to an additional device based on a respective tracked location of the additional device relative to the geographical meeting location, the regroup indicator including a displayable indication for the additional device to return to the geographical meeting location.

Alternatively, or in addition to the above-described mobile device, any one or combination of: updating the geographical meeting location responsive to a request received from the additional device to change the geographical meeting location. The regroup indicator includes a displayable route guide indicating a route from the respective tracked location of the additional device back to the geographical meeting location. A time duration to travel the route is based at least in part on a designated meeting time to regroup at the geographical meeting location. The regroup indicator includes displayable icons corresponding to the one or more additional devices, the displayable icons representing the respective tracked location of each of the additional devices relative to the geographical meeting location.

In some aspects, the techniques described herein relate to a system, including: a memory to maintain meeting parameters including one or more meeting locations; and a group manager to: communicate a geographical meeting location for one or more mobile devices; track a location of each of the one or more mobile devices relative to the geographical meeting location; and communicate a regroup indicator to a mobile device, the regroup indicator including a displayable indication for the mobile device to return to the geographical meeting location.

Alternatively, or in addition to the above-described mobile device, any one or combination of: the group manager is configured to update the geographical meeting location responsive to a request received from the mobile device to change the geographical meeting location. The regroup indicator includes a displayable route guide indicating a route from a tracked location of the mobile device back to the geographical meeting location. A time duration to travel the route is based at least in part on a designated meeting time to regroup at the geographical meeting location. The regroup indicator includes displayable icons corresponding to the one or more mobile devices, the displayable icons representing the respective tracked location of each of the mobile devices relative to the geographical meeting location.

In some aspects, the techniques described herein relate to a mobile device, including: at least one processor coupled with a memory; and a group manager configured to cause the mobile device to: receive, from a managing device, a designation of a geographical meeting location and regroup parameters for multiple devices including the mobile device; establish the mobile device as a coordinator of a subgroup of one or more of the multiple devices at a secondary meeting location; track a location of each of the one or more multiple devices in the subgroup relative to the secondary meeting location; and coordinate a regroup of the one or more multiple devices in the subgroup at the secondary meeting location prior to a designated time for all of the multiple devices to regroup at the geographical meeting location.

Alternatively, or in addition to the above-described mobile device, any one or combination of: the group manager is configured to cause the mobile device to set a scheduled secondary meeting time for the regroup of the one or more multiple devices in the subgroup at the secondary meeting location. The group manager is configured to cause the mobile device to: receive an updated regroup parameter from the managing device; and advance the scheduled secondary meeting time of the regroup of the one or more multiple devices in the subgroup at the secondary meeting location based on the updated regroup parameter. The group manager is configured to cause the mobile device to: determine a route between the secondary meeting location and the geographical meeting location; and adjust the scheduled secondary meeting time based on the route. The group manager is configured to cause the mobile device to: display a first type of visual indicator for each respective device of the one or more multiple devices in the subgroup; and display a second type of visual indicator for each respective device of the multiple devices outside of the subgroup. The group manager is configured to cause the mobile device to display, for each respective device of the one or more multiple devices in the subgroup, a respective route between the respective device and the secondary meeting location. The group manager is configured to cause the mobile device to communicate an alert setting to the one or more multiple devices in the subgroup, wherein, for each respective device of the one or more multiple devices in the subgroup, the alert setting causes the respective device to output an alert to return to the secondary meeting location based on a distance between a location of the respective device and the secondary meeting location. The secondary meeting location is based on a current geographical location of the mobile device. The group manager is configured to cause the mobile device to: set a virtual perimeter around the secondary meeting location; and while tracking the location of each of the one or more multiple devices in the subgroup relative to the secondary meeting location, output an alert responsive to the location of any of the one or more multiple devices in the subgroup being outside of the virtual perimeter. A size of the virtual perimeter is based on a route from the secondary meeting location to the geographical meeting location. The group manager is further configured to cause the mobile device to: determine a threshold distance of the secondary meeting location from the geographical meeting location based on the regroup parameters; and output an alert responsive to setting the secondary meeting location if a distance from the secondary meeting location to the geographical meeting location exceeds the threshold distance.

In some aspects, the techniques described herein relate to a method, including: receiving at a mobile device, from a managing device, a designation of a geographical meeting location and regroup parameters for multiple devices including the mobile device; establishing the mobile device as a coordinator of a subgroup of one or more of the multiple devices at a secondary meeting location; tracking a location of each of the one or more multiple devices in the subgroup relative to the secondary meeting location; and coordinating a regroup of the one or more multiple devices in the subgroup at the secondary meeting location prior to a designated time for all of the multiple devices to regroup at the geographical meeting location.

Alternatively, or in addition to the above-described mobile device, any one or combination of: setting a scheduled secondary meeting time for the regroup of the one or more multiple devices in the subgroup at the secondary meeting location; determining a route between the secondary meeting location and the geographical meeting location; and adjusting the scheduled secondary meeting time based on the route. Displaying, for each respective device of the one or more multiple devices in the subgroup, a first type of visual indicator and a respective route between the respective device and the secondary meeting location; and displaying a second type of visual indicator for each respective device of the multiple devices outside of the subgroup. Communicating an alert setting to the one or more multiple devices in the subgroup, wherein, for each respective device of the one or more multiple devices in the subgroup, the alert setting causes the respective device to output an alert to return to the secondary meeting location based on a distance between a location of the respective device and the secondary meeting location. Setting a virtual perimeter around the secondary meeting location; and while tracking the location of each of the one or more multiple devices in the subgroup relative to the secondary meeting location, outputting an alert responsive to the location of any of the one or more multiple devices in the subgroup being outside of the virtual perimeter.

In some aspects, the techniques described herein relate to a system, including: a memory to maintain a designation of a geographical meeting location and regroup parameters for multiple devices; and a group manager to: establish a mobile device of the multiple devices as a coordinator of a subgroup of one or more of the multiple devices at a secondary meeting location; track a location of each of the one or more multiple devices in the subgroup relative to the secondary meeting location; and coordinate a regroup of the one or more multiple devices in the subgroup at the secondary meeting location prior to a designated time for all of the multiple devices to regroup at the geographical meeting location.

Alternatively, or in addition to the above-described mobile device, any one or combination of: the group manager is configured to: set a scheduled secondary meeting time for the regroup of the one or more multiple devices in the subgroup at the secondary meeting location; determine a route between the secondary meeting location and the geographical meeting location; and adjust the scheduled secondary meeting time based on the route. The group manager is configured to: display, for each respective device of the one or more multiple devices in the subgroup, a first type of visual indicator and a respective route between the respective device and the secondary meeting location; and display a second type of visual indicator for each respective device of the multiple devices outside of the subgroup. The group manager is configured to communicate an alert setting to the one or more multiple devices in the subgroup, wherein, for each respective device of the one or more multiple devices in the subgroup, the alert setting causes the respective device to output an alert to return to the secondary meeting location based on a distance between a location of the respective device and the secondary meeting location.

The invention claimed is:

1. A mobile device, comprising:
at least one processor coupled with a memory; and
a group manager configured to cause the mobile device to:
receive a user input to the mobile device designating a geographical meeting location for the mobile device and one or more additional devices;
communicate, from the mobile device based on the user input, the geographical meeting location to the one or more additional devices;
track, at the mobile device based on the user input, a location of each of the one or more additional devices relative to the geographical meeting location; and
communicate, from the mobile device, a regroup indicator to at least one device of the one or more additional devices based on a respective tracked location of the at least one device relative to the geographical meeting location, the regroup indicator including a displayable indication for the at least one device to return to the geographical meeting location.

2. The mobile device of claim 1, wherein the regroup indicator includes a displayable meeting time to return to the geographical meeting location.

3. The mobile device of claim 2, wherein the displayable meeting time is formatted as at least one of a Coordinated Universal Time or a time duration.

4. The mobile device of claim 1, wherein the group manager is configured to cause the mobile device to update the geographical meeting location responsive to a meeting location update request received from any of the one or more additional devices.

5. The mobile device of claim 1, wherein the regroup indicator includes a displayable route guide indicating a route from the tracked location of the at least one device back to the geographical meeting location.

6. The mobile device of claim 5, wherein the regroup indicator includes an indication of a time duration to travel the route from the tracked location of the at least one device back to the geographical meeting location.

7. The mobile device of claim 6, wherein the time duration to travel the route is based at least in part on a designated meeting time set by the mobile device via the group manager to regroup the one or more additional devices at the geographical meeting location.

8. The mobile device of claim 1, wherein the regroup indicator includes displayable icons corresponding to the one or more additional devices, the displayable icons representing the respective tracked location of each of the one or more additional devices relative to the geographical meeting location.

9. The mobile device of claim 1, wherein the geographical meeting location corresponds to a current geographical location of the mobile device, and wherein the group manager is configured to cause the mobile device to:
update the geographical meeting location to the current geographical location of the mobile device; and
communicate the updated geographical meeting location to the one or more additional devices.

10. The mobile device of claim 1, wherein the user input designates an additional geographical meeting location for the mobile device and the one or more additional devices, and wherein the group manager is configured to cause the mobile device to:
communicate the additional geographical meeting location to the one or more additional devices;
track the location of each of the one or more additional devices relative to the additional geographical meeting location; and
communicate an additional regroup indicator to the at least one device based on the respective tracked location of the at least one device relative to the additional geographical meeting location, the additional regroup indicator including a displayable indication for the at least one device to return to the additional geographical meeting location along a route including the geographical meeting location and the additional geographical meeting location.

11. A method, comprising:
receiving a user input to a mobile device designating a geographical meeting location for the mobile device and one or more additional devices;
communicating, from the mobile device based on the user input, the geographical meeting location to the one or more additional devices;
tracking, by the mobile device based on the user input, a location of each of the one or more additional devices relative to the geographical meeting location; and
communicating, from the mobile device, a regroup indicator to at least one device of the one or more additional devices based on a respective tracked location of the at least one device relative to the geographical meeting location, the regroup indicator including a displayable indication for the at least one device to return to the geographical meeting location.

12. The method of claim 11, further comprising:
updating the geographical meeting location responsive to a request received from the at least one device to change the geographical meeting location.

13. The method of claim 11, wherein the regroup indicator includes a displayable route guide indicating a route from the respective tracked location of the at least one device back to the geographical meeting location.

14. The method of claim 13, wherein a time duration to travel the route is based at least in part on a designated meeting time to regroup at the geographical meeting location.

15. The method of claim 11, wherein the regroup indicator includes displayable icons corresponding to the one or more additional devices, the displayable icons representing the respective tracked location of each of the one or more additional devices relative to the geographical meeting location.

16. A system, comprising:

a memory to maintain meeting parameters including one or more geographical meeting locations; and a group manager to:

communicate a geographical meeting location of the one or more geographical meeting locations, the geographical meeting location designated for a plurality of mobile devices;

track a location of each of the plurality of mobile devices relative to the geographical meeting location; and communicate a regroup indicator to the plurality of mobile devices, the regroup indicator including a displayable indication for the plurality of mobile devices to return to the geographical meeting location.

17. The system of claim 16, wherein the group manager is configured to update the geographical meeting location responsive to a request received from at least one of the plurality of mobile devices to change the geographical meeting location.

18. The system of claim 16, wherein the regroup indicator includes a displayable route guide indicating a route from a tracked location of at least one of the plurality of mobile devices back to the geographical meeting location.

19. The system of claim 18, wherein a time duration to travel the route is based at least in part on a designated meeting time to regroup at the geographical meeting location.

20. The system of claim 16, wherein the regroup indicator includes displayable icons corresponding to the plurality of mobile devices, the displayable icons representing the respective tracked location of each of the plurality of mobile devices relative to the geographical meeting location.

* * * * *